(12) United States Patent
Safa-Bakhsh et al.

(10) Patent No.: US 9,489,340 B2
(45) Date of Patent: Nov. 8, 2016

(54) ELECTRICAL POWER HEALTH MONITORING SYSTEM

(71) Applicant: The Boeing Company, Chicago, IL (US)

(72) Inventors: Robab Safa-Bakhsh, Ridley Park, PA (US); Bruce D. Harmon, Ridley Park, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/791,396

(22) Filed: Mar. 8, 2013

(65) Prior Publication Data

US 2014/0257624 A1  Sep. 11, 2014

(51) Int. Cl.
  G06F 17/00  (2006.01)
  G07C 5/08  (2006.01)
  B64D 45/00  (2006.01)

(52) U.S. Cl.
  CPC ............ G06F 17/00 (2013.01); G07C 5/0808 (2013.01); B64D 2045/0085 (2013.01); B64D 2221/00 (2013.01)

(58) Field of Classification Search
  None
  See application file for complete search history.

(56) References Cited

U.S. PATENT DOCUMENTS

| | | | |
|---|---|---|---|
| 4,403,292 A | 9/1983 | Ejzak et al. | |
| 6,633,802 B2 | 10/2003 | Sodoski et al. | |
| 8,260,736 B1 * | 9/2012 | Lear et al. | 706/46 |
| 8,396,612 B2 * | 3/2013 | Fernandez-Ramos | G06F 1/189 70/3 |
| 8,738,268 B2 * | 5/2014 | Karimi | H02J 3/38 244/53 R |
| 2003/0047997 A1 | 3/2003 | Bernier | |
| 2003/0187554 A1 | 10/2003 | Henry et al. | |
| 2004/0124703 A1 * | 7/2004 | Tani et al. | 307/10.1 |
| 2006/0042846 A1 * | 3/2006 | Kojori et al. | 180/65.8 |
| 2007/0050104 A1 | 3/2007 | Wallace et al. | |
| 2008/0228331 A1 | 9/2008 | McNerney et al. | |
| 2008/0290666 A1 | 11/2008 | Bourgeau et al. | |
| 2009/0249128 A1 | 10/2009 | Heckman et al. | |
| 2009/0309551 A1 * | 12/2009 | Lazarovich et al. | 320/138 |
| 2010/0169030 A1 | 7/2010 | Parlos | |
| 2011/0087387 A1 | 4/2011 | Safa-Bakhsh et al. | |
| 2011/0135468 A1 | 6/2011 | Daniels et al. | |
| 2011/0172966 A1 * | 7/2011 | Albsmeier et al. | 702/183 |
| 2012/0226397 A1 * | 9/2012 | Sopko et al. | 701/22 |

FOREIGN PATENT DOCUMENTS

EP  2541853 A1  1/2013

OTHER PUBLICATIONS

Extended European Search Report for European Application No. 14158394.8, dated Jul. 3, 2014, 6 pages.
Keller et al., 'Aircraft Electrical Power Systems Prognostics and Health Management'; 1EEEAC paper #1380, Version 1, Updated Jan. 16, 2006; (12 pages).
Saha et al., 'A Distributed Prognostic Health Management Architecture'; Mission Critical Technologies (NASA Ames Research Center); NASA Ames Research Center'; Moffett Field, CA 94035; 2009; (14 pages).

* cited by examiner

Primary Examiner — John R Olszewski
Assistant Examiner — Nicholas K Wiltey
(74) Attorney, Agent, or Firm — Toler Law Group, PC

(57) ABSTRACT

An electrical power generation and distribution health monitoring system includes a network of a plurality of nodes included in an electrical system of a vehicle. Each node of the plurality of nodes is synchronized with other nodes of the plurality of nodes. The network is configured to communicate electrical system health data associated with the electrical system to at least one vehicle health reporting system.

24 Claims, 10 Drawing Sheets

ELECTRICAL POWER HEALTH MONITORING SYSTEM

FIELD OF THE DISCLOSURE

The present disclosure is generally related to an electrical power health monitoring system.

BACKGROUND

Vehicular power systems may generate, regulate, and distribute power (e.g., electricity) to vehicle systems. A generator of a vehicular power system may provide power to vehicle equipment with little system or status reporting (e.g., real-time reporting). The system or status reporting may provide a limited set of information that may be insufficient to precisely locate a fault detected in the vehicle power system during operation. A lack of information (e.g., operational performance and health data) about the vehicular power system may make troubleshooting detected faults a difficult and time consuming task.

As a result of the lack of information about the vehicular power system, components that are not faulty may be removed and tested. For example, a detected fault or failure may have been a result of a transient condition within a normal operating range of the components that cannot be identified based on available information. In this circumstance, testing the component fails to identify a failure or fault. Unnecessarily removing components from the vehicular power system adds to maintenance costs, increases labor costs, and impacts an availability of spare parts, increasing overall costs of operating a vehicle.

SUMMARY

Particular embodiments disclosed herein provide an electrical power generation and distribution health monitoring system that utilizes distributed system architecture. The distributed system architecture provides end-to-end, real-time health monitoring, management, and status reporting of an electrical power system (e.g., an electrical power generation and distribution system).

The distributed system architecture includes a network of a plurality of nodes that are time synchronized (e.g., via a common clock signal). The network of the plurality of nodes includes one or more remote nodes that each process data from a corresponding distribution circuit component to generate status information. Each of the one or more remote nodes communicates status information to a branch node (e.g., a primary power distribution branch node) via a communication backbone. The distributed system architecture is independent of a type of hardware used for communication between the nodes. Through remote nodes, the branch node receives the status information that is associated with one or more distribution circuit components of the electrical power generation and distribution health monitoring system. The branch node processes the status information to determine system health data and transfers the system health data to one or more vehicle systems via a vehicle bus.

A remote node may monitor and process data associated with a power distribution component (e.g., a contactor, a relay, a load controller, a load, or a power source) to determine a status (e.g., a health status) of the power distribution component. A branch node, associated with, interfaced with, or included in a generator control unit, may monitor and process data to determine a health status of a generator, the generator control unit, and the overall electrical, power system. In a particular embodiment, the remote node and the branch node are synchronized to provide time stamped data and health status information for diagnostic and/or prognostic analysis.

Processing of data in a distributed networked system architecture (e.g., at each remote node and branch node) enables diagnostic analysis of the electrical power system with a high level of fault detection, isolation, and localization. Accurately pinpointing a failure in the electrical system reduces troubleshooting time and increases availability of the vehicle. The distributed network system architecture also enables prognostic analysis of the electrical power system for predicting component failures, identifying condition based maintenance, and trending system operation for future design enhancements and product development.

In an embodiment, an electrical power generation and distribution health monitoring system includes a network of a plurality of nodes included in an electrical system of a vehicle. Each node of the plurality of nodes is synchronized with other nodes of the plurality of nodes. The network is configured to communicate electrical system health data associated with the electrical system to at least one vehicle health reporting system.

In another embodiment, a system includes a generator control unit (GCU) coupled to a generator. The GCU functions as a branch node and determines power generation system health data. The system also includes a contactor communicatively coupled to the GCU. The contactor functions as a first remote node and communicates contactor health data and a feeder identifier associated with the contactor to the GCU. The system further includes a load controller communicatively coupled to the GCU. The load controller functions as a second remote node and communicates load controller health data and a first bus identifier associated with the load controller to the GCU. The system also includes a load communicatively coupled to the GCU. The load functions as a third remote node and communicates load health data and a second bus identifier associated with the load controller to the GCU.

In another embodiment, a system includes a generator control unit (GCU) coupled to a generator. The GCU functions as a branch node and determines power generation system health data. The system also includes a contactor communicatively coupled to the GCU. The contactor functions as a first remote node and communicates contactor health data associated with the contactor to the GCU. The system further includes a load controller coupled to the GCU. The load controller functions as a second remote node and communicates load controller health data associated with the load controller to the GCU.

In another embodiment, a method includes receiving, at a branch node from a generator of an electrical system, generator data associated with the generator. The method also includes receiving, at the branch node from a generator control unit, generator control unit data associated with the generator control unit. The method further includes receiving, at the branch node from remote nodes of the electrical system, remote node health data associated with the remote nodes. The method also includes determining power generation system health data associated with a power generation system based on the generator data, the generator control unit data, and the remote node health data.

The features, functions, and advantages that have been described can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

An electrical power system of a vehicle is a distributed system that includes one or more remote nodes, which each communicates corresponding status information to a branch node (e.g., a primary power distribution branch node). The status information communicated by each remote node may be associated with one or more distribution circuit components of the electrical power system. The status information communicated by a particular remote node may include operating parameters associated with the particular remote node, diagnostic data associated with the particular remote node, prognostic data associated with the particular remote node, other information associated with the particular remote node, or a combination thereof.

The branch node may receive and process the status information received from the one or more remote nodes. The processed status information may be communicated as data, via a vehicle bus, to a vehicle system, such as a vehicle maintenance data collection and processing system. The data may be associated with a health of the electrical power system. The vehicle system may provide facilities for transferring the data to another device or system included in or not included in the vehicle. The data may include information associated with end-to-end health of the electrical power system (e.g., a power generation and distribution system).

Figure 1:
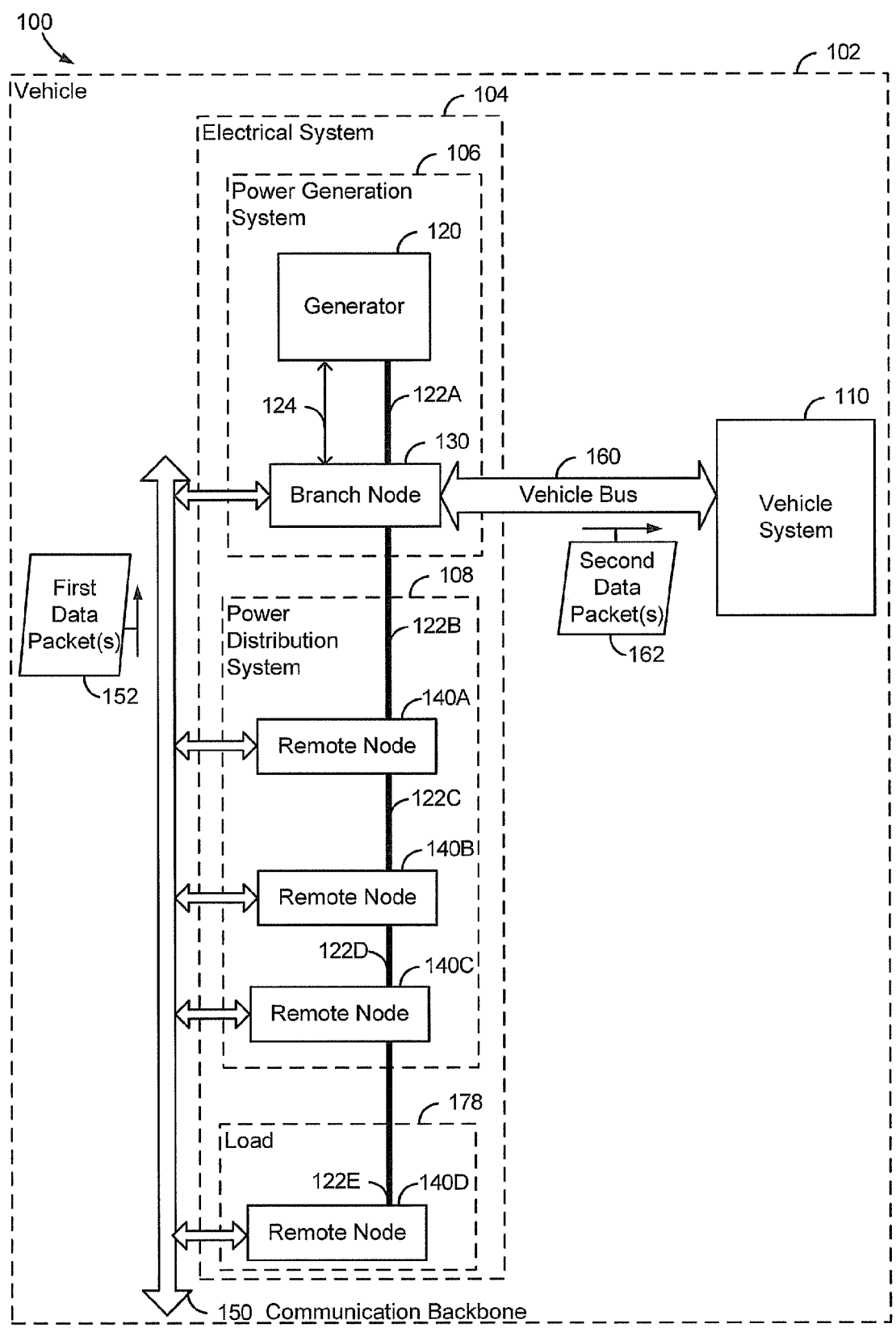
FIG. 1 is a block diagram illustrating a first particular embodiment of a vehicle including an electrical health system.

FIG. 1 illustrates a particular embodiment of a system 100 including an electrical power generation and distribution health monitoring system. The system 100 may include or may be included within a vehicle 102. The vehicle 102 may include an electrical system 104 (e.g., an electrical power system to generate and distribute power) and a vehicle system 110 (e.g., a vehicle health reporting system). The vehicle 102 may be an aircraft (e.g., a fixed wing aircraft or a rotary wing aircraft), a watercraft, a satellite, a spacecraft, a land craft, or another substantially self-contained structure (e.g., an oil rig) or platform (e.g., a mobile platform). In a particular embodiment, the vehicle 102 is a platform.

The electrical system 104 includes a power generation system 106 including a branch node 130, a power distribution system 108 including one or more remote nodes 140A-C, and a load 178 including one or more remote node(s) 140D. The electrical system 104 may be monitored by an electrical power generation and distribution health monitoring system, as described herein. The electrical power generation and distribution health monitoring system may include a network of a plurality of nodes associated with the electrical system 104. For example, the plurality of nodes may include the branch node 130, one or more of the remote nodes 140A-D, or a combination thereof. In a particular embodiment, each node of the plurality of nodes may be synchronized with other nodes of the plurality of nodes. For example, each of the nodes may receive a common clock signal. The network of the plurality of nodes may be configured to communicate electrical health system data associated with the electrical system 104 to at least one vehicle system, such as the vehicle system 110.

The power generation system 106 may include a generator 120 and the branch node 130. The generator 120 may be configured to generate electrical power to be distributed via the power distribution system 108 and the load 178, such as to the remote nodes 140A-D. For example, the generator 120 may provide electrical power to the power distribution system 108 and the load(s) 178 via one or more conductors (e.g., power lines 122A-E), via the branch node 130, or a combination thereof.

The generator 120 may include one or more sensors to provide data (e.g., status information) associated with one or more systems of the generator 120. The one or more systems (e.g., components) of the generator 120 may include a mechanical system (e.g., shaft(s) and bearing(s)), an electrical system (e.g., stator(s) and rotor(s), rotating diode(s), and resistor(s)), a cooling system (e.g., pump(s), valve(s), filter(s), a maintenance indication system), or combinations thereof. The generator 120 may provide the data to the branch node 130 via a connection 124 (e.g., one or more wires). The branch node 130 may generate (e.g., determine) status information associated with the generator 120 based on the data provided to the branch node 130, as described with reference to FIG. 3. In a particular embodiment, the branch node 130 collects data from the generator 120, a generator control unit, the vehicle system 110 (e.g., an aircraft systems), one or more remote nodes 140A-D, or a combination thereof.

The branch node 130 may control one or more operations of the generator 120. For example, the branch node 130 may include a generator control unit. The branch node 130 may control the one or more operations of the generator 120 using one or more control signals communicated via the connection 124. The one or more control signals may be based at least in part on the data received from the generator 120.

The branch node 130 may also, or in the alternative, generate (e.g., determine) status information (e.g., operating parameters based on sensed data) associated with the branch node 130. For example, the status information may be associated with one or more components of the branch node 130. The one or more components of the branch node 130 may include a relay, contactor boards, connectors, electronics (e.g., a field programmable gate array (FPGA), a microprocessor, or a clock), a power supply, a voltage regulator, or a combination thereof. The branch node 130 may determine the status information associated with the branch node 130, as described with reference to FIG. 3.

The branch node 130 may be communicatively coupled to the one or more remote nodes 140A-D via one or more communication backbones 150. The communication backbone 150 may include a serial link (e.g., a multi-drop serial link), a wireless link, power lines (e.g., power lines 122A-E), or a combination thereof. Communication via the power lines 122A-E may include transmitting one or more high frequency signal over the power lines 122A-E.

The remote nodes 140A-D may communicate information associated with a status of the power distribution system 108. Each remote node 140A-D may generate and transmit a corresponding data packet(s), such as a first data packet(s) 152. The first data packet 152 may include a single data packet or multiple data packets. The first data packet 152 may include health data as described with respect to FIG. 2. For example, the first data packet 152 may include health data, usage data (e.g., raw usage data or processed usage data), status information, operating parameters associated with a particular remote node diagnostic data associated with the particular remote node, prognostic data associated with the particular remote node, other information associated with the particular remote node, or a combination thereof. The remote nodes 140A-D may include one or more of a contactor, a load controller, a load, or a combination thereof.

In a particular embodiment, the branch node 130 may receive, from a first remote node 140A of the remote nodes 140A-D, first remote node health data associated with the first remote node 140A. For example, the branch node 130 may collect data from the generator 120, a generator control unit, the vehicle system 110 (e.g., an aircraft systems), one or more remote nodes 140A-D, or a combination thereof. The branch node 130 may also receive, from a second remote node 140B of the remote nodes 140A-D, second remote node health data associated with a second remote node 140B. The branch node 130 may also receive from the remote node 140D, third health data (e.g., load health data) associated with a third remote node 140D (e.g., a load). In a particular embodiment, one or more of the remote nodes 140A-D may periodically determine and communicate corresponding health data.

A particular remote node, such as one of the remote nodes 140A-D may monitor operational status information associated with the particular remote node. For example, monitoring the operational status information may include gathering one or more operating parameters, such as a temperature, a current, a voltage, a relay or breaker position, other information, or a combination thereof, associated with the particular remote node. The particular remote node may monitor the one or more operating parameters using one or more sensors that generate sensor data. The particular remote node may send health data, such as the first data packet 152, via the communication backbone 150 to the branch node 130 based on the sensor data. The first data packet 152 may include raw sensor data, processed sensor data (e.g., sensor data after filtering or performing analysis), information determined based on the sensor data (and possibly other data), or a combination thereof.

The branch node 130 may generate a second data packet(s) 162 associated with the electrical system 104. The second data packet 162 may be a single data packet or multiple data packets. The second data packet 162 may include system health data (e.g., electrical system health data) associated with the electrical system 104, as described further with respect to FIG. 3. For example, the second data packet 162 may include system health data, usage data (e.g., raw usage data or processed usage data), status information, operating parameters associated with the electrical system 104, diagnostic data associated with the electrical system 104, prognostic data associated with the electrical system 104, other information associated with the electrical system 104, or a combination thereof. The second data packet 162 may be based on status information (e.g., the data) received from the generator 120, the generator health data determined by the branch node 130, the status information associated with the branch node 130, branch node health data determined by the branch node 130, the first data packet 152, or a combination thereof.

The second data packet 162 may include information associated with health of a portion of or an entirety of the electrical system 104. For example, the second data packet 162 may include generation system health data associated with the power generation system 106, distribution system health data associated with the power distribution system 108, load health data associated with the load(s) 178, or a combination thereof. The second data packet 162 may include status information. For example, the second data packet 162 may provide an indication that a particular component of the electrical system 104 is functioning (e.g., is on or off), is operating at or according to a particular operating parameter (e.g., is providing a particular current or voltage or has a particular temperature), other status information (e.g., a switch is open or closed), or a combination thereof. The second data packet 162 may also, or in the alternative, include diagnostic information. For example, the second data packet 162 may provide an indication that a particular component of the electrical system 104 has a fault, is operating outside of or within a normal operating parameter range (e.g., based on comparison of sensed data from one or more remote nodes to corresponding thresholds), that a set of faults of the electrical system 104 appear to originate at a particular component (e.g., based on an analysis of sensed data from multiple remote nodes), other diagnostic information (e.g., historical faults), or a combination thereof. The second data packet 162 may also, or in the alternative, include prognostic information. For example, the second data packet 162 may provide an indication that a particular component of the electrical system 104 is approaching an operational limit, that sensed data associated with the particular component indicates operational degradation associated with the particular component or associated with another component, other prognostic information, or a combination thereof.

The branch node 130 may be communicatively coupled to the vehicle system 110. For example, the branch node 130 may be communicatively coupled to the vehicle system 110 via a serial link (e.g., a wired link), a wireless link, one or more power lines, an interface unit, or a combination thereof. In a particular embodiment, the branch node 130 may communicate the second data packet 162 to the vehicle system 110 via the vehicle bus 160. The vehicle bus 160 may include a serial bus that uses a protocol to facilitate communication between the branch node 130, the remote nodes 140A-D (e.g., various vehicle line replaceable units), and the vehicle system 110. Examples of such protocols and vehicle buses are U.S. Department of Defense Military Standard (MIL-STD) 1553, Aeronautical Radio, Incorporated (ARINC) 429, Avionics Full-Duplex Switched Ethernet (AFDX), ARINC 664, and a controller area network (CAN) bus.

The vehicle system 110 may include a vehicle central data collection, processing, and reporting unit that is configured to collect, process, and report vehicle system status information. The vehicle system 110 may be a dedicated system or a shared system supporting other vehicle system functionalities. For example, the vehicle system 110 may include a vehicle health management system, a mission system (e.g., a mission computer), a maintenance system (e.g., a maintenance data loader system), a ground based computer, a support equipment device, data downloader hardware, or a combination thereof. The vehicle system 110 may provide (e.g., report) the vehicle system status information to an operator of the vehicle 102, to a maintenance technician (e.g., a ground crew member) associated with the vehicle, to a diagnostic professional associated with the vehicle 102, or to one or more off-board systems.

During operation, the generator 120 of the power generation system 106 generates electrical power that is provided to one or more components of the electrical system 104. For example, the electrical power may be provided to the branch node 130, the one or more remote nodes 140A-D, or a combination thereof.

The electrical system 104 may be monitored during operation by the network of nodes that includes the branch node 130, the one or more remote nodes 140A-D, or a combination thereof. For example, the branch node 130 may receive generator data associated with operation of the generator 120. Additionally, the branch node 130 may receive the first data packet 152 from one of the remote nodes 140A-D. The branch node 130 may also determine status data associated with one or more components of the branch node 130.

The branch node 130 may determine (e.g., generate) the second data packet 162 associated with the electrical system 104 based on the generator data, the first data packet 152, the status data associated with the one or more components of the branch node 130, or a combination thereof. The second data packet 162 may include power generation system health data associated with the power generation system 106.

The branch node 130 may communicate the second data packet 162 (e.g., the power generation system health data) to the vehicle system 110. In a particular embodiment, the vehicle system 110 includes a health management system, a vehicle health reporting system, or a combination thereof.

In a particular embodiment, the second data packet 162 (e.g., power generation system health data, distribution system health data, or a combination thereof) is time-stamped and synchronized with the vehicle system 110. For example, a common clock signal may be provided to a particular vehicle system, such as the vehicle system 110, and to the network of the plurality of nodes, such as the branch node 130, the remote nodes 140A-D, or a combination thereof. To illustrate, the common clock signal may be provided from the vehicle system 110 to the branch node 130 via the vehicle bus 160. The branch node 130 may distribute the common clock signal to the remote nodes 140A-D via the communication backbone 150. The common clock signal, distributed via the communication backbone 150, may enable synchronization of the plurality of nodes. Each node of the plurality of nodes may timestamp data that it gathers, processes or generates based on the common clock signal. Accordingly, all the data collected and determined by the plurality of nodes may be synchronized or sequenced to provide a picture of the operation of the electrical system 104 over time.

Accordingly, the vehicle system 110 may be provided with, and may provide to other systems, synchronized (e.g., coordinated in time) health status data of the electrical system 104. The synchronized health status data may facilitate diagnosis of the electrical system 104 or other components of the vehicle 102. Further, the synchronized health status data may facilitate prognostics, projecting health of the electrical system 104 (e.g., estimating time to failure or scheduling replacement of components).

Figure 2:
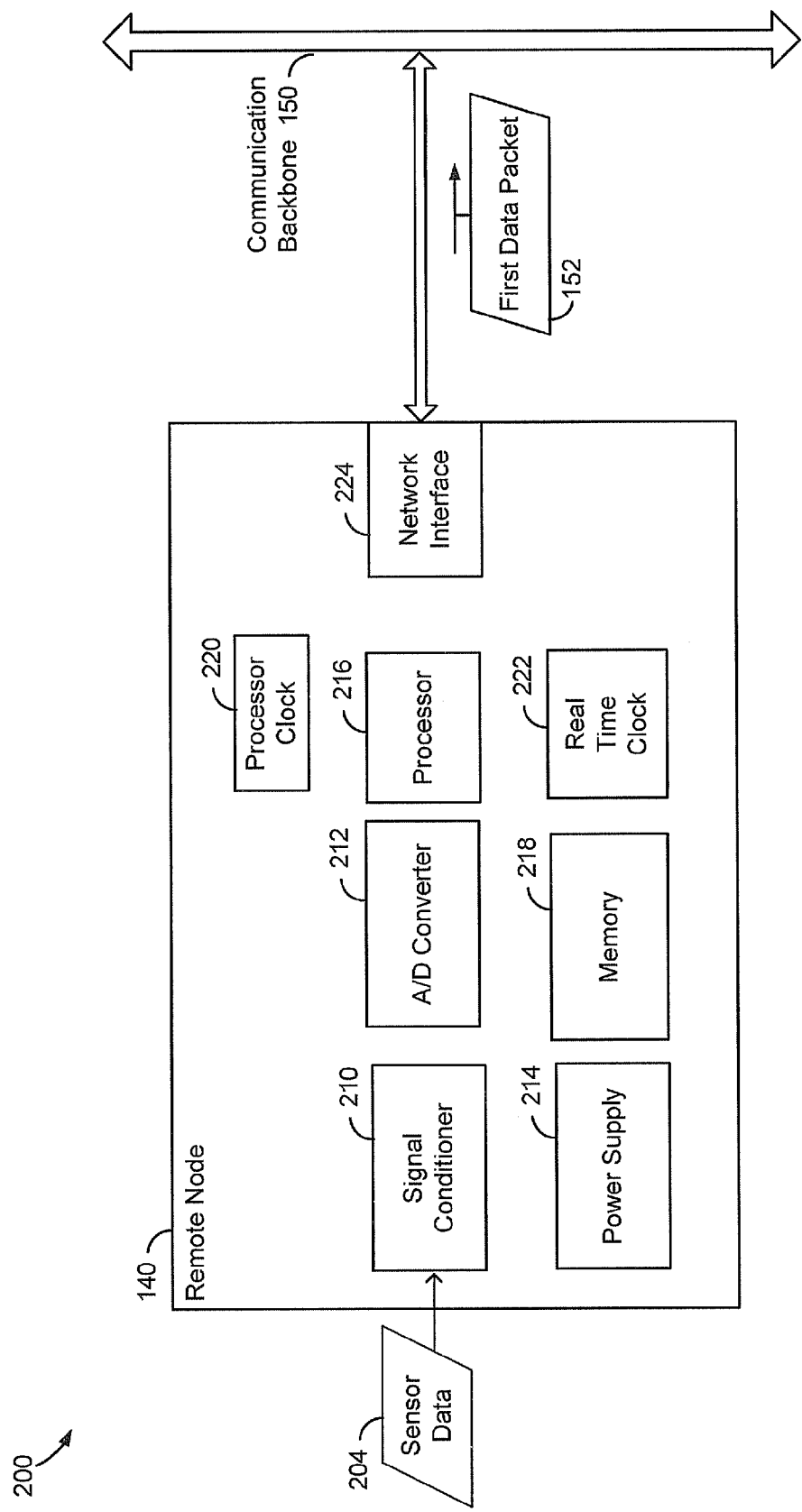
FIG. 2 is a block diagram illustrating a particular embodiment of a remote node of the electrical health system of FIG. 1.

Referring to FIG. 2, a particular embodiment of a system 200 including the remote node 140 of FIG. 1 is shown. In the embodiment illustrated in FIG. 2, the remote node 140 includes a signal conditioner 210, an analog to digital (A/D) converter 212, a power supply 214, a processor 216, a memory 218, a processor clock 220, a real time clock 222, and a network interface 224. In other embodiments, the remote node 140 may include more, fewer, or different components.

The remote node 140 may be included within or associated with a device of an electrical system of a vehicle, such as the electrical system 104 of FIG. 1. For example, the remote node 140 may be included within or associated with a contactor, a load controller, a load, another device or component of the electrical system, or a combination thereof. The remote node 140 may receive or generate sensor data 204 (e.g., analog data) that is associated with the device. For example, the sensor data 204 may indicate a temperature associated with the device, a voltage associated with the device, a current associated with the device, another environmental or operating parameter associated with the device, or a combination thereof.

The signal conditioner 210 may receive the sensor data 204 and condition the sensor data 204 to improve a quality of the sensor data 204. For example, the signal conditioner 210 may condition the sensor data 204 by amplifying the sensor data 204, filtering noise from the sensor data 204, or both. The conditioned sensor data 204 may be provided to the A/D converter 212.

The A/D converter 212 may convert the conditioned sensor data 204 from an analog format to a digital format (e.g., by sampling and encoding the conditioned sensor data 204). The digital format may enable the processor 216 to receive a digitized version of the sensor data 204 as an input to facilitate analysis or other processing of the sensor data 204.

The processor 216 (e.g., a microprocessor) may process the sensor data 204 in the digital format to generate the first data packet 152. The first data packet 152 may include health data, usage data (e.g., raw usage data or processed usage data), status information, operating parameters associated with the remote node 140, diagnostic data associated with the remote node 140, prognostic data associated with the remote node 140, other information associated with the remote node 140, or a combination thereof. The processor 216 may cause the sensor data 204 in the digital format or at least a portion of the first data packet 152 (e.g., processed sensor data) to be stored in the memory 218. The processor 216 may process the sensor data 204 by comparing values of the sensor data to one or more threshold values, by mathematically or logically combining values of the sensor data (e.g., based on one or more equations or rules), by mathematically or logically combining values of the sensor data with other values (e.g., values from the memory 218), or a combination thereof. In a particular embodiment, as described further with reference to FIG. 7, the processor 216 may execute instructions from the memory 218 to diagnose a condition of the device (e.g., to determine diagnostic data), to project a condition of the device (e.g., to determine prognostic data), or both.

The memory 218 may include temporary storage (e.g., a random access memory (RAM) or a buffer), persistent storage, or a combination thereof. The memory 218 may store at least the portion of the first data packet 152, the sensor data 204 in the digital format, instructions executable by the processor 216, or a combination thereof. The portion of the first data packet 152 may include the processed sensor data, the sensor data 204 in the digital format, or a combination thereof. The portion of the first data packet 152 may also include a timestamp to facilitate synchronization or time sequencing of the portion of the first data packet 152 with other data, such as data from another remote node or data from a branch node.

The network interface 224 of the remote node 140 may output the first data packet 152 via the communication backbone 150. The network interface 224 may include transceiver hardware and associated components to enable sending and receiving of information via the communication backbone 150, such as a serial bus, a wired link, a wireless link, a power line link, or a combination thereof. The remote node 140 may output the first data packet 152 based on a request (e.g., a request from the branch node 130 of FIG. 1), after a period of time (e.g., after expiration of a time period), in response to an event (e.g., detection of particular sensor data that satisfies a threshold), or a combination thereof.

The processor clock 220 may provide a local clock signal to the processor 216 or to other components of the remote node 140 to regulate an instruction cycle of the processor 216. In a particular embodiment, the processor clock 220 is a local crystal oscillator. The real time clock 222 may enable time stamping of the sensor data 204, the first data packet 152, data included in the first data packet 152, or a combination thereof. The real time clock 222 may be synchronized with real time clocks of other nodes or with a central clock. For example, the real time clock 222 may be a local device that is periodically or occasional calibrated to synchronize the real time clock 222 with the clocks of the other nodes. In another example, the real time clock 222 may receive a common clock signal from the central clock and provide timing information to the processor 216 or other components of the remote node 140 to enable time stamping of data. To illustrate, a central vehicle time may be provided to the remote node 140 via the communication backbone 150 from the branch node 130, the vehicle system 110, or another system or subsystem of the vehicle 102 of FIG. 1. The real time clock 222 may indicate a standard time measure (e.g., Greenwich Mean Time) or a time value that is local to the vehicle.

Time stamping may enable the sensor data 204, data included in the first data packet 152, or the first data packet 152 to be synchronized, time sequenced, or combined (e.g., associated) with other data associated with the vehicle. The time stamp may be applied (e.g., attached or stored with) to the sensor data 204, the first data packet 152, or a combination thereof, based on a time the sensor data 204 is received by the remote node 140, a time the sensor data 204 in the digital format is processed by the processor 216, or a combination thereof.

The power supply 214, such as a power source, may be a local power supply (e.g., a battery), an energy harvester, or an external source (e.g., the generator 120 via one or more power lines 122A-E of FIG. 1). The power supply 214 may also include power conversion hardware to convert power received via an electrical system (e.g., the electrical system 104 of FIG. 1) to power suitable for use by the remote node 140. For example, the power supply 214 may include a transformer, a rectifier, a power filter, another power conversion device or circuitry, or a combination thereof.

Thus, the remote node 140 illustrate in FIG. 2 is able to access sensed data (e.g., the sensor data 204) related to a device of the electrical power distribution system that is associated with the remote node 140 and to analyze the sensed data, such as the sensor data 204, to provide the first data packet 152. The first data packet 152, or a portion thereof, may be provided to a branch node (e.g., the branch node 130 of FIG. 1), to a vehicle system (e.g., the vehicle system 110 of FIG. 1) which may include an electrical power generation and distribution health monitoring system, or to a combination thereof. For example, the branch node may forward the first data packet 152, or a portion thereof, to the vehicle system. The first data packet 152, or a portion thereof, may enable the branch node or the vehicle system to assess health of the remote node 140, the device, or both. Thus, the remote node 140 may facilitate determining diagnostic information or prognostic information related to the electrical power distribution system.

Figure 3:
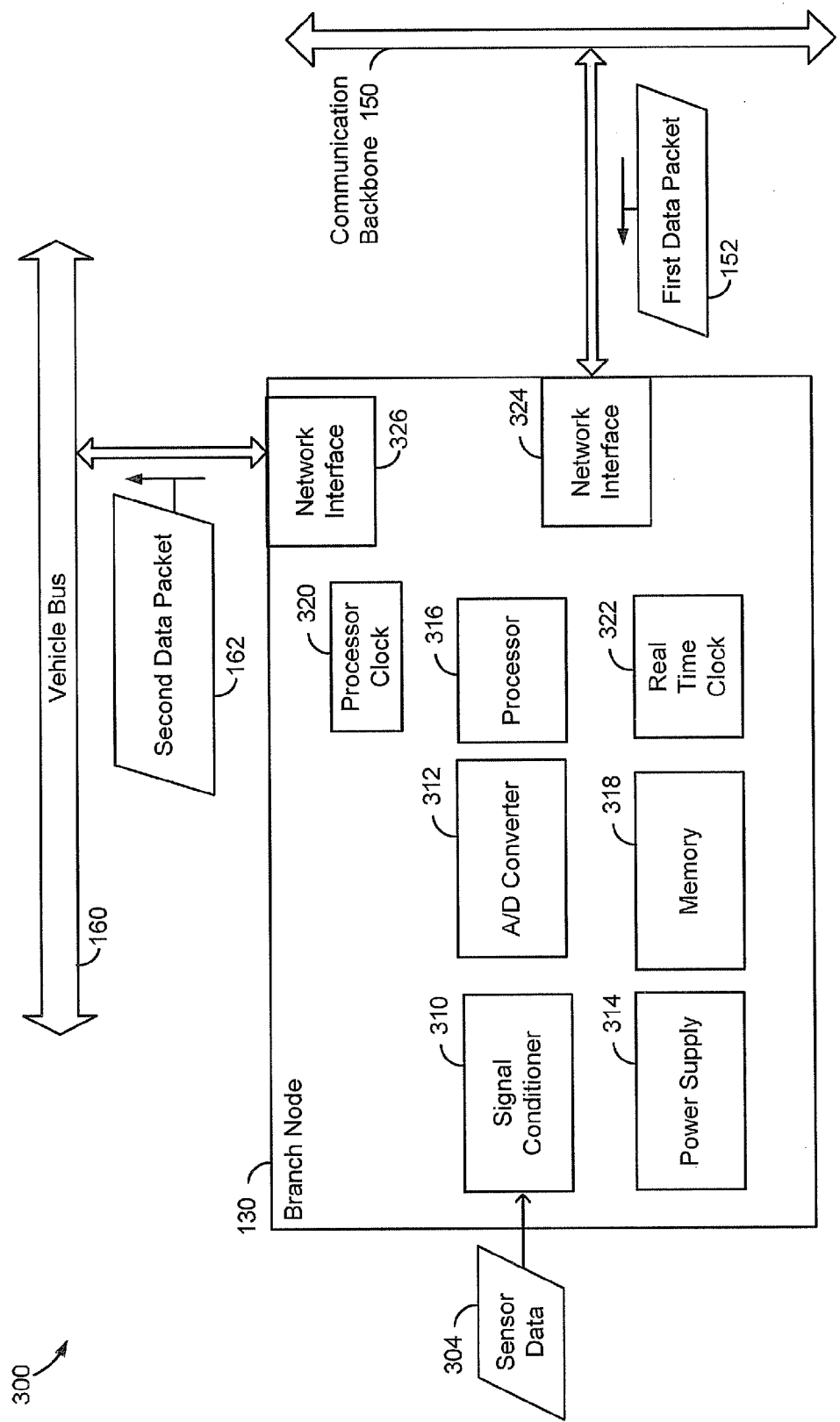
FIG. 3 is a block diagram illustrating a particular embodiment of a branch node of the electrical health system of FIG. 1.

Referring to FIG. 3, a particular embodiment of a system 300 including the branch node 130 of FIG. 1 is shown. In the embodiment illustrated in FIG. 3, the branch node 130 includes a signal conditioner 310, an analog to digital (A/D) converter 312, a power supply 314, a processor 316, a memory 318, a processor clock 320, a real time clock 322, a first network interface 324, and a second network interface 326. In other embodiments, the branch node 130 may include more, fewer, or different components. For example, the first network interface 324 and the second network interface 326 may be a single interface in some embodiments.

The branch node 130 may be included within or associated with a device of an electrical system of a vehicle, such as the electrical system 104 of FIG. 1. For example, the branch node 130 may be included within or associated with a generator (e.g., the generator 120 of FIG. 1), a generator control unit, another device or component of the electrical system, or a combination thereof. The branch node 130 may receive or generate sensor data 304 (e.g., analog data) that is associated with the device. For example, the sensor data 304 may indicate a temperature associated with the device, a voltage associated with the device, a current associated with the device, another environmental or operating parameter associated with the device, or a combination thereof. The branch node may receive information to derive the operating time, cycle time and control logic of generator control unit.

The signal conditioner 310 may receive the sensor data 304 and may condition the sensor data 304 to improve a quality of the sensor data 304. For example, the signal conditioner 310 may condition the sensor data 304 by amplifying the sensor data 304, filtering noise from the sensor data 304, or both. The conditioned sensor data 304 may be provided to the A/D converter 312.

The A/D converter 312 may convert the conditioned sensor data 304 from an analog format to a digital format (e.g., by sampling and encoding the sensor data 304). The digital format may enable the processor 316 to receive a digitized version of the conditioned sensor data 304 as an input to facilitate analysis or other processing of the sensor data 304.

The processor 316 (e.g., a microprocessor) may process the sensor data 304 in the digital format to generate processed sensor data, such as the first data packet 152. The processor 316 may cause the sensor data 304 in the digital format, the processed sensor data, at least a portion of the first data packet 152, at least a portion of the second data packet 162, other data, or a combination thereof, to be stored in the memory 318. The processor 316 may process the sensor data 304 by comparing values of the sensor data to one or more threshold values, by mathematically or logically combining values of the sensor data (e.g., based on one or more equations or rules), by mathematically or logically combining values of the sensor data with other values (e.g., values from the memory 318 or values from the first data packet 152), or a combination thereof. Additionally or in the alternative, the processor 316 may process at least a portion of the first data packet 152. For example, the processor 316 may compare data (e.g., values) received from a first remote node to data (e.g., values) received from a second remote node, may mathematically or logically combine the values received from the first remote node and the values received from the second remote node, or a combination thereof.

Figure 7:
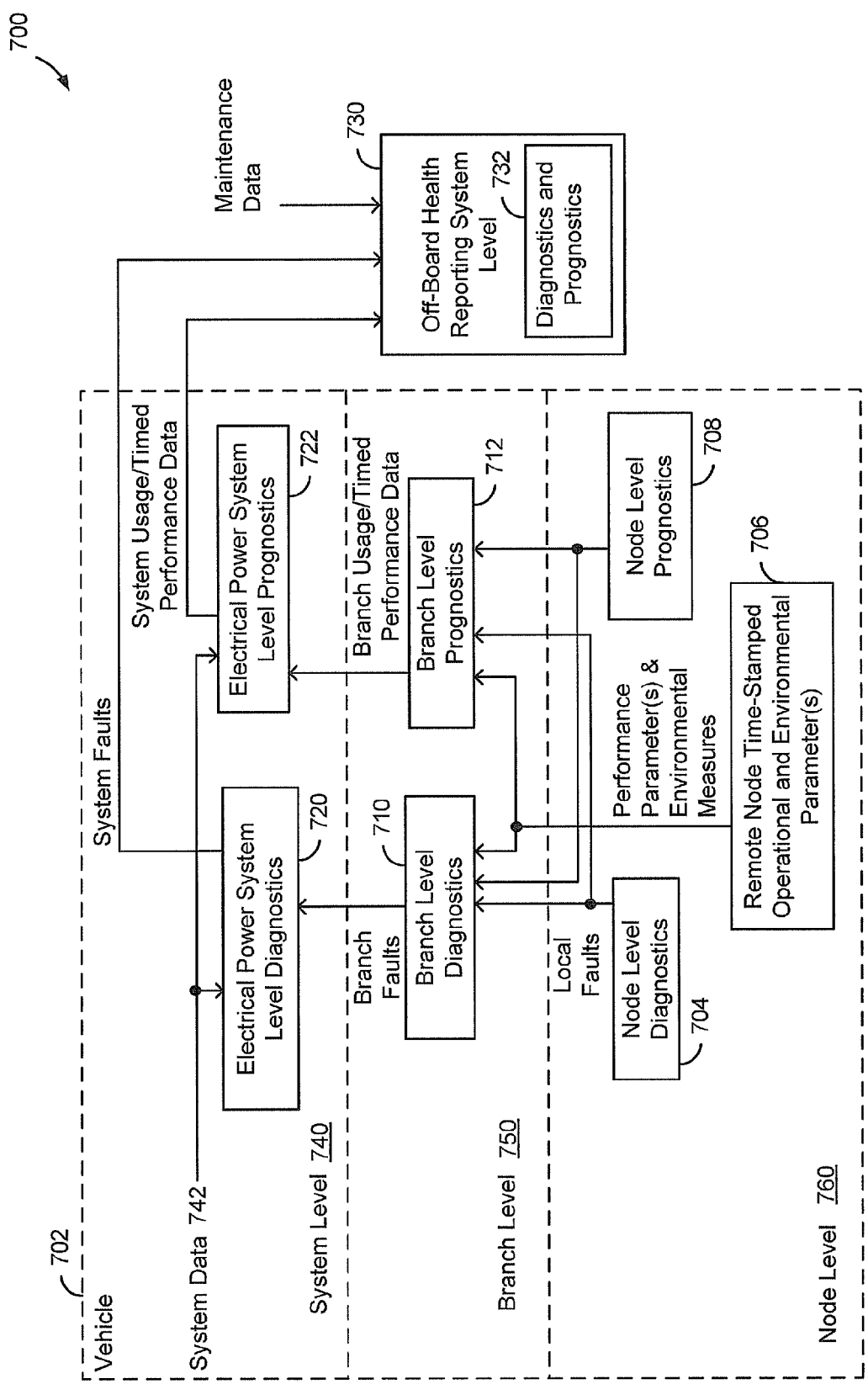
FIG. 7 is a diagram illustrating a particular embodiment of an electrical power system health system architecture.

In a particular embodiment, as described further with reference to FIG. 7, the processor 316 may execute instructions from the memory 318 to diagnose a condition of the device (e.g., to determine diagnostic data), to project a condition of the device (e.g., to determine prognostic data), or both. Alternatively or in addition, the processor 316 may execute instructions from the memory 318 to diagnose a condition of a device associated with a remote node (e.g., to determine diagnostic data), to project a condition of the device associated with the remote node (e.g., to determine prognostic data), or both.

The memory 318 may include temporary storage (e.g., a random access memory (RAM) or a buffer), persistent storage, or a combination thereof. The memory 318 may store at least the portion of the first data packet 152, at least the portion of the second data packet 162, the sensor data 304 in the digital format, instructions executable by the processor 316, or a combination thereof. The second data packet 162 may include the sensor data 304 (e.g., raw sensor data), the processed sensor data, the sensor data 304 in the digital format, at least the portion of the first data packet 152, or a combination thereof. The second data packet 162 may also include a timestamp to facilitate synchronization or time sequencing of the second data packet 162 with other data, such as data from another branch node.

The first network interface 324 of the branch node 130 may be configured to receive the first data packet 152 via the communication backbone 150. The second network interface 326 may be configured to transmit the second data packet 162 via the vehicle bus 160. Each of the network interfaces 324, 326 may include transceiver hardware (e.g., a transmitter and a receiver) and associated components to enable sending and receiving of information via a serial bus, a wired link, a wireless link, a power line link, or a combination thereof. The branch node 130 may query remote nodes to retrieve the first data packet 152. For example, the branch node 130 may query one or more of the remote nodes 140A-D after a period of time (e.g., after expiration of a time period), in response to an event (e.g., detection of particular sensor data that satisfies a threshold or detection of remote node health data received from another node that satisfies a threshold), or a combination thereof. The branch node 130 may output the second data packet 162 based on a request (e.g., a request from the vehicle system 110 of FIG. 1), after a period of time (e.g., after expiration of a time period), in response to an event (e.g., detection of particular sensor data that satisfies a threshold), or a combination thereof.

The processor clock 320 may provide a local clock signal to the processor 316 or to other components of the branch node 130 to regulate an instruction cycle of the processor 316. In a particular embodiment, the processor clock 320 is a local crystal oscillator. The real time clock 322 may enable time stamping of the sensor data 304, the first data packet 152, the second data packet 162, or a combination thereof. The real time clock 322 may be synchronized with real time clocks of other nodes or a central clock. For example, the real time clock 322 may be a local device that is periodically or occasional calibrated to synchronize the real time clock 322 with the clocks of the other nodes. In another example, the real time clock 322 may receive a common clock signal from the central clock and provide timing information to the processor 316 or other components of the branch node 130 to enable time stamping of data. To illustrate, a central vehicle time may be provided to the branch node via the communication backbone 150 or via the vehicle bus 160. In a particular embodiment, the branch node 130 provides a clock signal to remote nodes, loads, or a combination thereof, that are coupled to the branch node 130 via the communication backbone 150. The real time clock 322 may indicate a standard time measure (e.g., Greenwich Mean Time) or a time value that is local to the vehicle.

Time stamping may enable the sensor data 304, the first data packet 152, or the second data packet 162 to be synchronized, time sequenced, or combined (e.g., associated) with other data associated with the vehicle. The time stamp may be applied (e.g., attached or stored with) to the sensor data 304, the first data packet 152, data included in the first data packet 152, the second data packet 162, data included in the second data packet 162, or a combination thereof, based on a time the sensor data 304 is received by the branch node 130, a time the sensor data 304 in the digital format is processed by processor 316, or a combination thereof.

The power supply 314 (e.g., a power source) may be a local power supply (e.g., a battery), an energy harvester, or an external source (e.g., the generator 120 via one or more power lines 122A-E of FIG. 1). The power supply 314 may also include power conversion hardware to convert power received via an electrical system (e.g., the electrical system 104 of FIG. 1) to power suitable for use by the branch node 130. For example, the power supply 314 may include a transformer, a rectifier, a power filter, another power conversion device or circuitry, or a combination thereof.

Thus, the branch node 130 illustrate in FIG. 3 is able to access sensed data (e.g., the sensor data 304) related to a device of the electrical power distribution system that is associated with the branch node 130 and to analyze the sensed data and the first data packet 152 to provide the second data packet 162. The second data packet 162 may be provided to the vehicle system 110 of FIG. 1, such as a vehicle reporting system. The second data packet 162 may enable the vehicle reporting system to assess health of the branch node 130, a remote node associated with the branch node 130, the device associated with the branch node, a load associated with the branch node 130, or a combination thereof. Thus, the branch node 130 may facilitate determining diagnostic information or prognostic information related to the electrical power distribution system.

Figure 4:
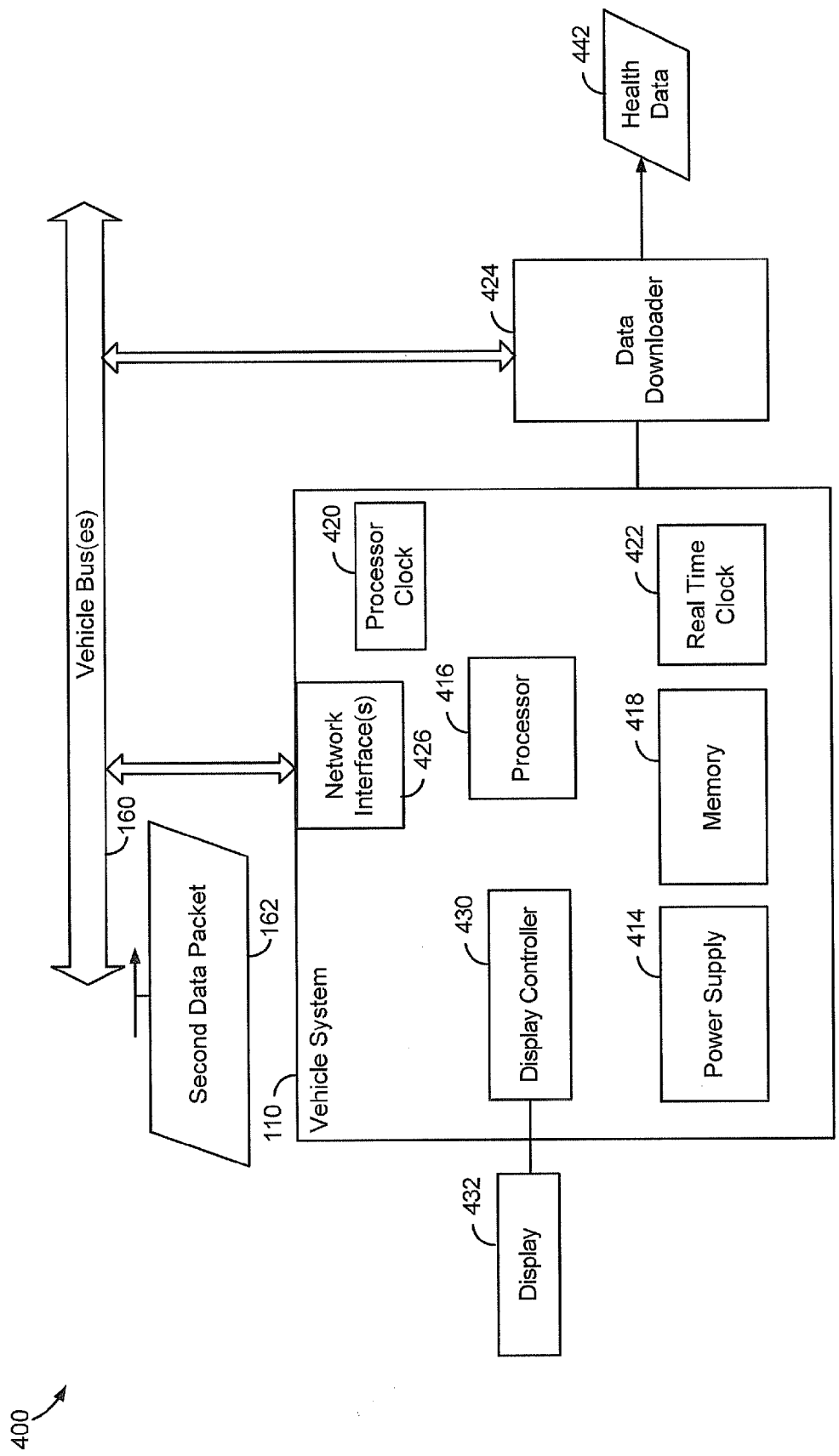
FIG. 4 is a block diagram illustrating a particular embodiment of the exemplary vehicle system of the vehicle of FIG. 1.

Referring to FIG. 4, an exemplary embodiment of a system 400 including the vehicle system 110 of FIG. 1 is shown. In a particular embodiment, the vehicle system 110 may be configured to perform system level diagnostics and prognostics associated with one or more systems of a vehicle, such as the vehicle 102 of FIG. 1. For example, the vehicle system 110 may include an on-board vehicle health management system of the vehicle 102 and may perform system level diagnostics and prognostics on the electrical power system 104 of FIG. 1. The vehicle system 110 may be a standalone hardware device or may be included in another vehicle system that performs functions other than vehicle health management functions or vehicle health reporting functions. In the particular embodiment illustrated in FIG. 4, the vehicle system 110 includes a power supply 414, a processor 416, a memory 418, a processor clock 420, a timing device (e.g., a real time clock 422), a network interface 426, and a display controller 430. In other embodiments, the vehicle system 110 may include more, fewer, or different components. The vehicle system 110 may be coupled to a data downloader 424. Alternatively, the vehicle system 110 may include the data downloader 424.

The vehicle system 110 may include a network interface 426 to facilitate communication with other devices via the vehicle bus 160. The network interface 426 may include transceiver hardware (e.g., a transmitter and a receiver) and associated components to enable sending and receiving of information via the vehicle bus 160. The vehicle system 110 may receive system health data, such as the second data packet 162, from a network of a plurality of nodes (e.g., including the branch node 130, the remote nodes 140A-D, or a combination thereof, of FIG. 1). At least a portion of the second data packet 162 may be provided to the processor 416, stored in the memory 418, or both. The vehicle system 110 may receive the second data packet 162 periodically or in response to a request sent by the vehicle system to one or more nodes of the network of the plurality of nodes.

The processor 416 (e.g., a microprocessor) may be configured to perform data processing, initiate data storage, initiate communication of data, or a combination thereof. For example, the processor 416 may process the second data packet 162 to determine system health data, such as diagnostic data, to determine prognostic data, or a combination thereof. The processor 416 may store the system health data (e.g., processed system health data) at the memory 418. The processor 416 may process the second data packet 162 by comparing values of data included in the second data packet 162 to one or more threshold values, by mathematically or logically combining values of the data included in the second data packet 162 (e.g., based on one or more equations or rules), by mathematically or logically combining values of the data included in the second data packet 162 with other values (e.g., values from the memory 418), or a combination thereof. In a particular embodiment, as described further with reference to FIG. 7, the processor 416 may execute instructions from the memory 418 to diagnose a condition of the vehicle or of a component of the vehicle (e.g., to determine diagnostic data), to project a condition of the vehicle or of a component of the vehicle (e.g., to determine prognostic data), or a combination thereof. The processor 416 may also, or in the alternative, arrange data values or fields of the second data packet 162 in a time sequence based on time stamps associated with the data values or fields.

The processor 416 may communicate the second data packet 162, the processed system health data, an indication associated with the processed health data (e.g., an alert related to an identified issue in the electrical power system 104 of FIG. 1), other data, or a combination thereof, as status information to the display 432 via the display controller 430.

The display 432 may be positioned within the vehicle such that an operator of the vehicle 102 may view the status information. Alternatively, the display 432 may be positioned external to the vehicle such that personnel external to the vehicle may view the status information.

The memory 418 may include temporary storage (e.g., a random access memory (RAM) or a buffer), persistent storage, or a combination thereof. The memory 418 may store at least a portion of the second data packet 162, the health data 442, instructions executable by the processor 416, or a combination thereof. The health data 442 may include at least the portion of the second data packet 162, processed system health data determined by the processor 416 executing the instructions from the memory 418, other data, or a combination thereof. The health data 442 may also include a timestamp to facilitate synchronization or time sequencing of the health data 442 with other data, such as data from another vehicle.

The processor clock 420 may provide a local clock signal to the processor 416 or to other components of the vehicle system 110 to regulate an instruction cycle of the processor 416. In a particular embodiment, the processor clock 420 is a local crystal oscillator. The real time clock 422 may enable time stamping of data at the vehicle system 110. The real time clock 422 may be synchronized with real time clocks of branch nodes and/or remote nodes of the vehicle, with a central clock of the vehicle, or with another reference clock. For example, the real time clock 422 may be a local device that is periodically or occasional calibrated to the reference clock, to real time clocks of the branch nodes or remote nodes, or both. In another example, the real time clock 422 may provide a common clock signal that is used to provide timing information the branch node(s) and/or remote nodes of the vehicle. The real time clock 422 may indicate a standard time measure (e.g., Greenwich Mean Time) or a time value that is local to the vehicle.

The power supply 414 (e.g., power source) may be a local power supply (e.g., a battery), an energy harvester, or an external source (e.g., the generator 120 via one or more power lines 122A-E of FIG. 1). The power supply 414 may also include power conversion hardware to convert power received via an electrical system (e.g., the electrical system 104 of FIG. 1) to power suitable for use by the vehicle system 110. For example, the power supply 414 may include a transformer, a rectifier, a power filter, another power conversion device or circuitry, or a combination thereof.

The data downloader 424 may be coupled to the vehicle system 110, the vehicle bus 160, or a combination thereof. The data downloader 424 may enable transmission of data, such as the health data 442 from the vehicle system 110 or data from another vehicle system received at the data downloader 424 via the vehicle bus 160, to a system external to (e.g., off-board) the vehicle. For example, the data downloader 424 may include an RF transmitter, a universal serial bus (USB) interface, an Ethernet interface, a memory card data interface, another data interface, or a combination thereof. When the health data 442 is transmitted from the data downloader 424, the health data 442 may be transmitted in a single data packet or in multiple data packets or data files.

Thus, the vehicle system 110 illustrated in FIG. 4 is able to analyze the second data packet 162 to provide the health data 442. The health data 442 may enable an electrical power generation and distribution health monitoring system to assess health of one or more devices of an electrical power generation and distribution system. Thus, the vehicle system 110 may facilitate determining diagnostic information or prognostic information related to the electrical power distribution system.

Figure 5:
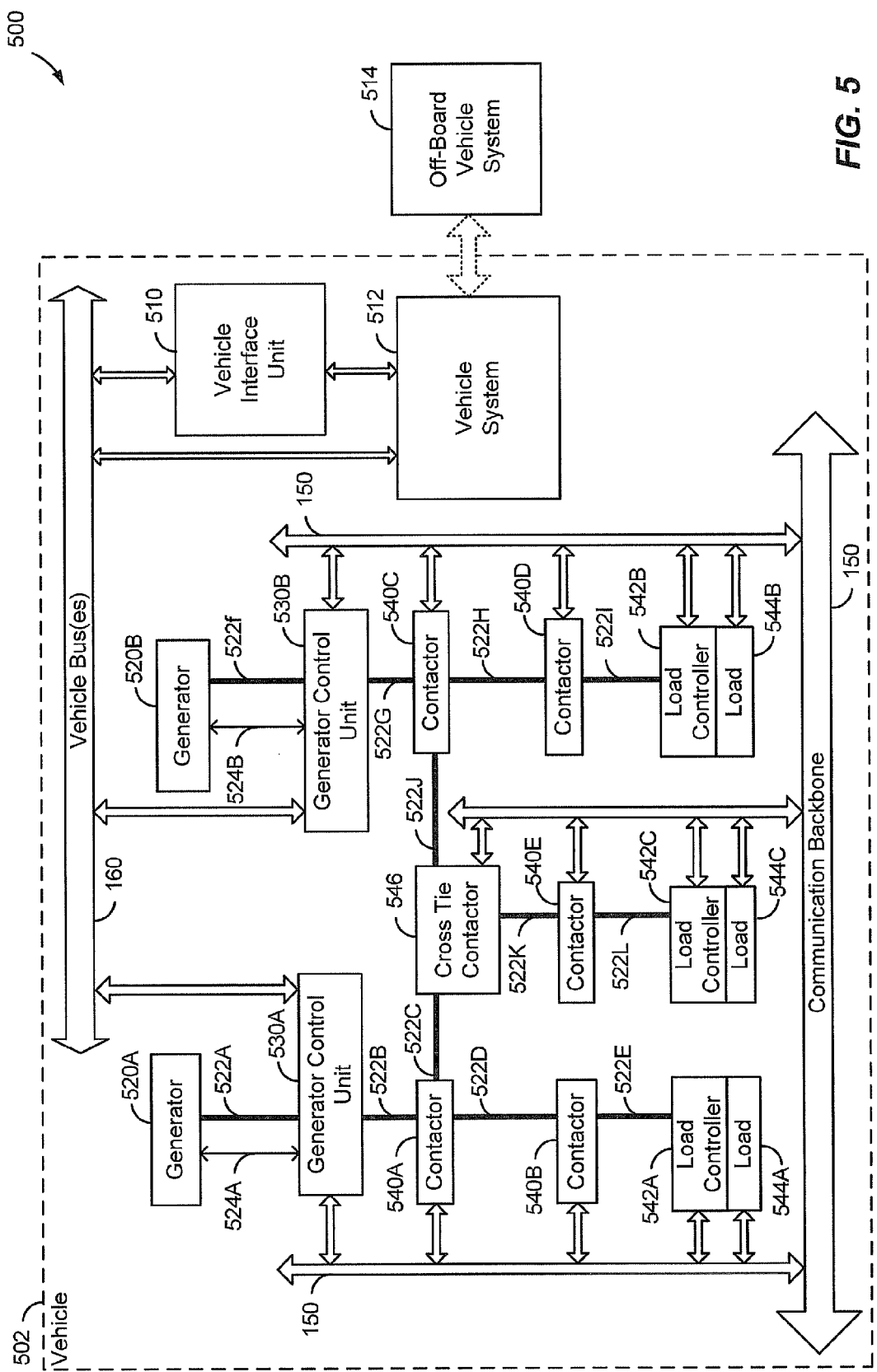
FIG. 5 is a block diagram illustrating a second particular embodiment of a vehicle including an electrical health system.

FIG. 5 illustrates a particular embodiment of a system 500 including a vehicle 502. The vehicle 502 may include an electrical system and an associated vehicle system 512, such as a vehicle health reporting system. The vehicle 502 may be an aircraft, a watercraft, a spacecraft, a land craft, or another substantially self-contained structure (e.g., an oil platform).

The electrical system may be arranged hierarchically to include one or more branch nodes 130 and one or more remote nodes. Branch nodes may include devices that are coupled at or near a top (hierarchically) of a particular branch of a power distribution system. In the embodiment illustrated in FIG. 5, the one or more branch nodes include generator control units 530A-B. Remote nodes may include devices that are coupled to the particular branch of the electrical system below (hierarchically) a branch node. In the embodiment illustrated in FIG. 5, the one or more remote nodes include contactors 540A-E, a cross tie contactor 546, load controllers 542A-C, loads 544A-544C, or a combination thereof. A branch node may be coupled to one or more associated remote nodes via a communication backbone 150, via one or more power lines 522A-L, or a combination thereof. Additionally, a particular remote node may be coupled to a branch node through or via one or more other remote nodes. For example, a first load controller 542A may be coupled to a first generator control unit 530A via one or more contactors, such as a first contactor 540A and a second contactor 540B.

The one or more branch nodes and one or more remote nodes may together form a distributed network that communicates electrical system health data associated with the electrical system to at least one vehicle system, such as the vehicle system 512. In a particular embodiment, each node of the one or more branch nodes and one or more remote nodes may be synchronized with one or more other nodes. Thus, the electrical system health data may be synchronized or able to be time-sequenced (e.g., using associated time stamps) to determine diagnostic or prognostic information related to the electrical system. For example, each node of the one or more branch nodes and one or more remote nodes may receive a common clock signal, as described with reference to FIGS. 2-4.

Each branch of the electrical system may include a generator, such as a first generator 520A associated with a first branch (e.g., the first generator control unit 530A) and a second generator 520B associated with a second branch (e.g., the second generator control unit 530B). The generators 520A-B may be configured to generate electrical power to be distributed via a power distribution system corresponding to a remaining portion of the branch. For example, the first generator 520A may provide electrical power to a first branch including the first and second contactors 540A-B, the first load controller 542A and the first load 544A. Similarly, the second generator 520B may provide electrical power to a second branch including a third contactor 540C, a fourth contactor 540D, a second load controller 542B, and a second load 544B. Additionally, depending on states of the first contactor 540A, the third contactor 540C and the cross tie contactor 546, either the first generator 520A, the second generator 520B, or both, may provide power to a third branch of the electrical system including a fifth contactor 540E, a third load controller 542C and a third load 544C.

Each of the generators 520A-B may include one or more sensors to provide data (e.g., status information) associated with the generator to a corresponding branch node (e.g., to a corresponding one of the generator control units 530A-B). For example, the generators 520A-B may each include a mechanical system (e.g., shaft(s) and bearing(s)), an electrical system (e.g., stator(s) and rotor(s), rotating diode(s), and resistor(s)), a cooling system (e.g., pump(s), valve(s), filter(s), a maintenance indication system), or combinations thereof. The one or more sensors may gather information related to the electrical system, the mechanical system or the cooling system of the generators 520A-B. Examples of information related to the electrical system of the generator include output voltage, current or frequency, resistance across particular components (e.g., contacts), etc. Examples of information related to the mechanical system of the generator include vibration magnitude or frequency, rotation rate of a rotating component, etc. Examples of information related to the cooling system of the generator include coolant flow rate, valve positions, coolant temperature, coolant age (e.g., a time since the coolant was changed), coolant levels, etc. Each branch node (e.g., the generator control units 530A-B) may generate or determine status information associated with the corresponding generator 520A-B based on the data provided to the branch node by the generator 520A-B.

One or more of the generator control units 530A-B may be a smart generator control units (e.g., may include a processor and instructions executable by the processor to perform analysis or other operations related to data provided to the generator control unit). For example, each generator control unit 530A-B may execute instructions to receive information from one of the generators 520A-B (and other devices that communicate with the generator control unit 530A-B) and analyze the received information.

In a particular embodiment, each generator control unit 530A-B may execute instructions to diagnose faults with a device coupled to a branch of the electrical system that is controlled by the generator control unit 530A-B. For example, the first generator control unit 530A may receive information from the first generator 520A, such as mechanical system information, electrical system information, cooling system information, or a combination thereof. The first generator control unit 530A may also, or in the alternative, receive information from other devices of the first branch, such as the first contactor 540A, the second contactor 540B, the first load controller 542A, the first load 544A, or a combination thereof. When the third branch is coupled to the first generator control unit 530A, the first generator control unit 530A may receive information from devices of the third branch, such as the fifth contactor 540E, the third load controller 542C, the third load 544C, the cross tie contactor 546, or a combination thereof. The first generator control unit 530A may analyze the information from the first generator 520A, the information received from devices of the first branch, the information received from devices of the third branch, or a combination thereof to diagnose one or more of the device, the first branch, the third branch, or the electrical system as a whole.

In a particular embodiment, each generator control unit 530A-B may execute instructions to predict or project conditions related a device coupled to the corresponding branch of the electrical system based on information received from the devices coupled to the branch. For example, the first generator control unit 530A may analyze the information from the first generator 520A, the information received from devices of the first branch, the information received from devices of the third branch, or a combination thereof to generate prognostic information related to one or more of the device, the first branch, the third branch, or the electrical system as a whole.

Each generator control unit 530A-B may determine power generation system health data based on the information received from various components of the electrical system, analysis results (e.g., diagnostic information or prognostic information), or a combination thereof. The generator control units 530A-B may communicate the power generation system health data to the vehicle system 512 (e.g., an on-board vehicle system), an off-board vehicle system 514, or both. For example, the generator control units 530A-B may transmit one or more data packets that include the power generation system health data periodically, in response to a detected event, or in response to a query from the vehicle system 512 or the off-board vehicle system 514. The generator control units 530A-B may transmit the power generation system health data (e.g., the one or more data packets, such as the second data packet 162 of FIG. 1) via a vehicle bus 160, a vehicle interface unit 510, or both. For example, the vehicle system 512 may be coupled to the one or more vehicle buses 160 directly, via the vehicle interface unit 510, or a combination thereof.

One or more of the contactors 540A-E may be a smart contactor. That is, one or more of the contactors 540A-E may include a processor and instructions executable by the processor to perform analysis or other operations related to data provided to the contactor. For example, a processor of each contactor 540A-E may execute instructions to receive information from a sensor of the contactor, from a node below the contactor (hierarchically) in the branch (e.g., from a load or load controller), or both. The processor of each contactor 540A-E may also execute instructions to analyze the received information to generate information about the health of the contactors (e.g., contactor health data), information about the health of the node below the contactor (e.g., node health data, such as load health data or load controller health data), power flow parameters in the distribution system (e.g., voltage, current, or frequency), usage parameters (e.g., operational time), information about the health of feeders and busses, other information, or a combination thereof. The processor of each contactor 540A-E may also execute instructions to communicate the contactor health data, the node health data, the power flow parameters, contactor usage data, the usage parameters, the other information, or the combination thereof to a branch node of the corresponding branch (e.g., one of the generator control unit 530A-B in the embodiment illustrated in FIG. 5). For example, the processor of each contactor 540A-E may generate a data packet, such as the first data packet 152 of FIG. 1, to communicate the contactor health data, the node health data, the power flow parameters, the contactor usage data, the usage parameters, a feeder identifier (e.g., identifying a feeder, such as an electrical power cable or bus of the power distribution system, that the contactor 540A-E is coupled to), the other information, or the combination thereof to a branch node of the corresponding branch.

Examples of parameters that may be monitored by a sensor associated with one of the contactors 540A-E and used to determine the contactor health data include contactor temperature (e.g., winding temperature or terminal temperature), current (e.g., current through a winding or terminal of the contactor), voltage (voltage drop across a terminal), and frequency (e.g., power frequency received at a terminal). The contactors 540A-E may determine the contactor health data occasionally (e.g., in response to an event or a detected condition) or periodically. The contactors 540A-E may time stamp the contactor health data, the node health data, the power flow parameters, the usage parameters, other data used to determine the contactor health data. For example, each contactor 540A-E may receive a common clock signal from a component of the vehicle, such as the vehicle system 512, or one or more of the generator control units 530A-B.

One or more of the load controllers 542A-C may be a smart load controller (e.g., may include a processor and instructions executable by the processor to perform analysis or other operations related to data provided to the load controller). For example, a processor of each load controller 542A-C may execute instructions to receive information from a sensor of the load controller, from a node below the load controller (hierarchically) in the branch (e.g., from a load), or both. Each load controller 542A-C may also execute instructions to analyze the received information to generate information about the health of the load controller (e.g., load controller health data), information about the health of the node below the load controller (e.g., node load data), power flow parameters in the distribution system (e.g., voltage, current, or frequency), usage parameters (e.g., operational time), other information, or a combination thereof. Each load controller 542A-E may also execute instructions to communicate the load controller health data, the load health data, the power flow parameters, the usage parameters, a bus identifier (e.g., identifying a bus of the power distribution system that the load controller 542A-E is coupled to), the other information, or the combination thereof to a branch node of the corresponding branch (e.g., one of the generator control unit 530A-B in the embodiment illustrated in FIG. 5).

In a particular embodiment, one or more of the load controllers 542A-C includes a solid-state circuit breaker. One or more of the load controllers 542A-C may also, or in the alternative, include sensors to monitor a load 544A-C coupled to the load controller 542A-C. For example, the first load controller 542A may monitor parameters related to power provided to the first load 544A. The monitored parameters may include, for example, voltage, current, frequency, usage (e.g., on time or off time), other data, or a combination thereof. The first load controller 542A may also, or in the alternative, monitor other parameters related to the first load 544A, such as temperature of a component of the first load 544A, environmental parameters (e.g., humidity), or other parameters related to the operation of the first load 544A. One or more of the load controllers 542A-C may determine the load controller health data or the load health data based on information received from the sensors or other information received from the loads 544A-C.

In a particular embodiment, one or more of the loads 544A-C may be a smart load. That is, one or more of the loads 544A-C may include a processor and instructions executable by the processor to perform analysis or other operations related to data provided to the load. For example, a processor of each load 544A-C may execute instructions to receive information from a sensor of the load. The processor of each load 544A-C may also execute instructions to analyze the received information to generate information about the health of the load (e.g., load health data), power flow parameters in at the load (e.g., voltage, current, or frequency), usage parameters (e.g., operational time of the load), other information, or a combination thereof. The processor of each load 544A-C may also execute instructions to communicate the load health data, the power flow parameters, the usage parameters, a bus identifier (e.g., identifying a bus of the power distribution system that the loads 544A-C is coupled to), the other information, or the combination thereof to a branch node of the corresponding branch (e.g., one of the generator control unit 530A-B in the embodiment illustrated in FIG. 5).

Thus, the system 500 enables gathering of performance data related to the electrical system of the vehicle. The system 500 also enables distributed analysis of the performance data and other data to diagnose faults with the electrical system or to generate prognostic data that projects future problems with the electrical system.

Figure 6:
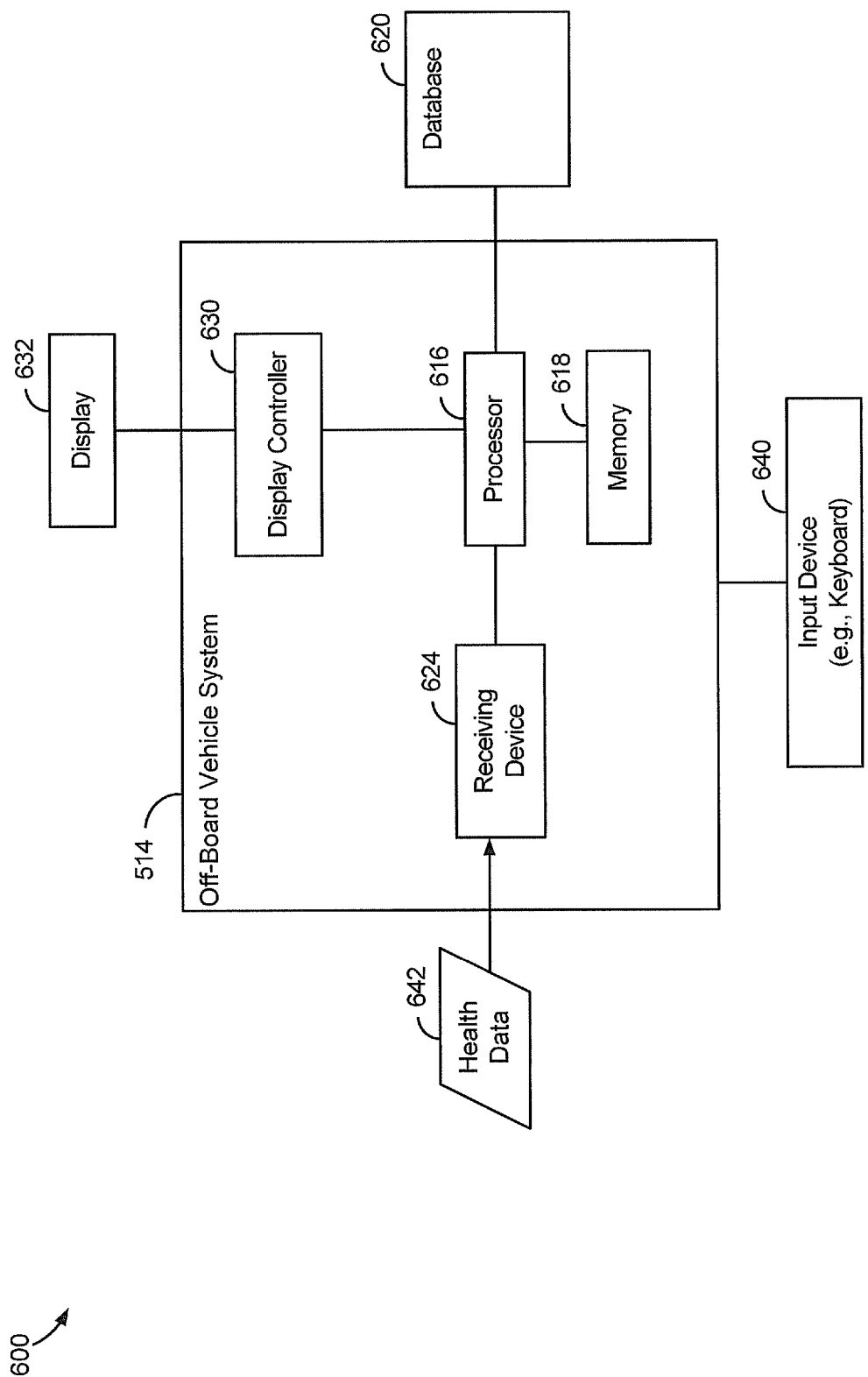
FIG. 6 is a block diagram illustrating a particular embodiment of an off-board vehicle system associated with the vehicle of FIG. 5.

Referring to FIG. 6, an exemplary embodiment of a system 600 including an off-board vehicle system, such as the off-board vehicle system 514 of FIG. 5 is shown. The off-board vehicle system 514 may be configured to perform diagnostics and prognostics associated with one or more systems of a vehicle, such as the vehicle 102 of FIG. 1 or the vehicle 502 of FIG. 5. For example, the off-board vehicle system 514 may perform diagnostics and prognostics associated with an electrical power system of the vehicle. The off-board vehicle reporting system 514 may be a standalone, stationary or portable computing device or may be included within another system that performs vehicle health management functions or functions other than vehicle health management functions, such as an aircraft fleet maintenance management computing system.

The off-board vehicle system 514 may include a receiving device 624, a processor 616, a memory 618, a display controller 630, one or more other components, or a combination thereof. The receiving device 624 may receive information, such as health data 642, associated with one or more systems of the vehicle. For example, the receiving device 624 may include an RF transceiver (e.g., a wireless modem), a universal serial bus (USB)/Ethernet interface, a memory card data interface, or a combination thereof. The receiving device 624 may receive the health data 642 and provide the health data to the processor 616. The health data 642 may include, be included within, or correspond to the health data 442 of FIG. 4.

The memory 618 may include temporary storage (e.g., a random access memory (RAM) or a buffer), persistent storage, or a combination thereof. The memory 618 may store data, such as the health data 642, instructions executable by the processor 616, one or more diagnostic algorithms, one or more prognostic algorithms, or a combination thereof.

The processor 616 may execute instructions from the memory 618 to process the health data 642 to identify one or more issues, such as faults or maintenance items, associated with a system corresponding to the health data 642. The processor 616 may communicate the one or more issues, the health data 642, or a combination thereof, to a display 632 via the display controller 630. The off-board vehicle system 514 may include or be coupled to an input device 640, such as a keyboard, a mouse, or a touch screen, to enable an operator of the off-board vehicle system 514 to initiate processing of the health data 642 by the processor 616 or to evaluate information presented via the display 632.

The processor 616 may also access the database 620 and obtain information from the database 620. The database 620 may include a mass data storage device, such a database server that hosts a large volume of information (e.g., data) and enables a search and retrieval of the information. The information accessed from the database 620 may be used to facilitate processing of the health data 642. For example, the information stored in the database 620 may be associated with the one or more systems of the vehicle 502. To illustrate, the information may include failure and/or maintenance history related to the one or more systems or related to similar systems of other vehicles (e.g., vehicle fleet failure or maintenance history). In another example, the information stored in the database 620 may include thresholds or rules (e.g., mathematical and/or logical equations) used to analyze the health data 642.

Using the information received from the database 620, the processor 616 may process the health data 642 by performing diagnostic analysis or prognostic analysis on the health data 642. The processor 616 may store the processed health data at the memory 618, at the database 620, or a combination thereof.

Referring to FIG. 7, an exemplary embodiment of a system 700 including an electrical power system health system architecture is shown. The electrical power system health architecture may include, be included within or correspond to the system 100 of FIG. 1 or the system 500 of FIG. 5.

The system 700 may include a vehicle 702. The vehicle 702 may include or be coupled to a health reporting system that is illustrated in FIG. 7 as including multiple logical divisions, including a system level 740, a branch level 750, a node level 760, and an off-board health reporting system level 730. The system level 740, the branch level 750, and the node level 760 may be time synchronized so that data communicated by a transmitting level (e.g., the node level 760, the branch level 750, or the system level 740) may be correlated with (e.g., time sequenced with) other data generated at or received at a received level (e.g., the branch level 750, the system level 740, or the off-board health reporting system level 730). The vehicle 702 may be configured to be selectively coupled to the off-board health reporting system level 730 via a data interface (not shown if FIG. 7). The off-board health reporting system level 730 may include, be included within, or correspond to the off-board vehicle system 514 of FIG. 5.

The node level 760 may include node level diagnostics 704, node level prognostics 708, and remote node time-stamped operational and environmental parameter(s) 706. In a particular embodiment, the node level 760 may include one or more local remote systems including the remote nodes 140A-D 190 of FIG. 1, the contactors 540A-E, the load controllers 542A-C, the loads 544A-C, the cross tie contactor 546 of FIG. 5, or a combination thereof.

The node level diagnostics 704 may include instructions that are executable by a processor associated with a remote node to process sensor data associated with the remote node and to assess a health of the remote node. Devices of the node level diagnostics 704 may send data to the branch level 750. For example, a particular remote node may execute node level diagnostics 704 and may output a set of condition indicators (e.g., local faults) representing the health of the particular remote node to a device of the branch level 750 (e.g., a branch node). To illustrate, when the particular remote node is a contactor, the node level diagnostics 704 associated with the contactor may report whether the contactor is functional (e.g., has no fault), has failed open or closed, or whether a fail data bit associated with the contactor indicates an electronic failure, other state information associated with the contactor, or a combination thereof. The node level diagnostics reports faults associated with the input feeders and busses The node level prognostics 708 may include instructions that are executable by a processor associated with a remote node to process remote node data, such as state, usage, and performance parameters to predict or project degradation, fatigue, or failure of the remote node. The node level prognostics 708 may output information descriptive of or related to the predicted or projected degradation, fatigue, or failure of the remote node. For example, when the node level prognostics 708 are associated with a contactor, the node level prognostics 708 may output information descriptive of or related to changes in contact resistant over time, changes in contact temperature over time, changes in voltage drop over time, other changes detected in performance of the contactor, or a combination thereof.

The remote node time-stamped operational and environmental parameters 706 may include one or more environmental parameters (e.g., environmental measures), one or more operation parameters (e.g., performance parameters), or a combination thereof, that impact health of the one or more remote nodes. For example, the one or more environmental parameters may indicate a temperature, a vibration, and/or a humidity associated with one or more remote nodes. In another example, the one or more operation parameters may include the usage data used by the node level prognostics 708 or other data from which performance of the one or more local systems can be derived.

The branch level 750 may include branch level diagnostics 710 and branch level prognostics 712. The branch level 750 may include one or more branch nodes, such as the branch node 130 of FIG. 1, the generator control units 530A-B of FIG. 5, or a combination thereof.

The branch level diagnostics 710 may include instructions that are executable by a processor associated with a branch node to process sensor data associated with the branch node, the remote node time-stamped operational and environment parameters 706, the node level diagnostics 704, the node level prognostics 708, or a combination thereof, to assess a health of the branch node or remote nodes associated with the branch node. The branch level diagnostics 710 may output, to the system level 740, information representing the health of one or more branch nodes, health of the one or more remote nodes, feeders, busses or a combination thereof.

The branch level prognostics 712 may include instructions that are executable by a processor associated with a branch node to process the sensor data associated with the branch node, the remote node time-stamped operational and environment parameters 706, the node level diagnostics 704, the node level prognostics 708, or a combination thereof, to predict or project degradation, fatigue, or failure of the branch node or an associated remote node. For example, the branch level prognostics 712 may generate cumulative usage data (e.g., time usage, cycle usage or fatigue usage), as well as, time stamped periodic performance data, or data that can be derived from the performance data, for the one or more branch level systems or one or more node level systems.

The system level 740 may include electrical power system level diagnostics 720 and electrical power system level prognostics 722. In a particular embodiment, the system level 740 may include one or more vehicle systems, such as the vehicle system 110 of FIG. 1, the vehicle system 512 of FIG. 5, or a combination thereof.

The electrical power system level diagnostics 720 may include instructions that are executable by a processor associated with the vehicle 702 to determine diagnostic information by processing system data 742 associated with one or more vehicle systems of the vehicle 702, by processing data received from the branch level diagnostics, or a combination thereof. The diagnostic information may represent a health of the one or more vehicle systems (e.g., system faults), a health of the one or more branch nodes, a health of the one or more remote nodes, or a combination thereof. For example, the electrical power system level diagnostics 720 may determine whether a detected failure is caused by a device at the node level 760, the branch level 750, or the system level 740. The electrical power system level diagnostics 720 may provide the diagnostic information to the electrical power system level prognostics 722, the off-board health reporting system level 730, or both.

The electrical power system level prognostics 722 may include instructions that are executable by a processor associated with the vehicle 702 to determine prognostic information by processing the system data 742, prognostic data received from the branch level 750, or a combination thereof. For example, the electrical power system level prognostics 722 may analyze the system data 742 and/or the prognostic data received from the branch level 750 to predict or project degradation, fatigue, or failure of a device or system of the system level 740, the branch level 750, or the node level 760. The electrical power system level prognostics 722 may output the prognostic information (including, for example, system usage and timed performance data) to the off-board health reporting system level 730.

The off-board health reporting system level 730 may include diagnostics and prognostics 732. The off-board health reporting system level 730 may include, be included within or correspond to the off-board system 514 of FIG. 5.

The off-board health reporting system level 730 may receive data output by the system level 740 (e.g., the diagnostic information output by the electrical power system level diagnostics 720, the prognostic information output by the electrical power system level prognostics 722, or a combination thereof). The off-board health reporting system level 730 may also receive other data, such as maintenance data (e.g., failure data and maintenance history data or maintenance technical data, such as recommended replacement intervals for particular components) associated with one or more components or systems associated with the vehicle 702.

The off-board health reporting system level 730 may include instructions that are executable by a processor associated with the off-board health reporting system level 730 to process the diagnostic information, the prognostic information, or both. For example, the off-board health reporting system level 730 may analyze the diagnostic information, the prognostic information, or both, to identify one or more faults associated with the vehicle 702, vehicle system usage/timed performance data, or a combination thereof. The one or more faults, the vehicle usage/timed performance data, or both, may be provided to a vehicle operator or a vehicle technician to coordinate maintenance (e.g., scheduled maintenance) and assist in repair (e.g., unscheduled maintenance) of the vehicle.

Figure 8:
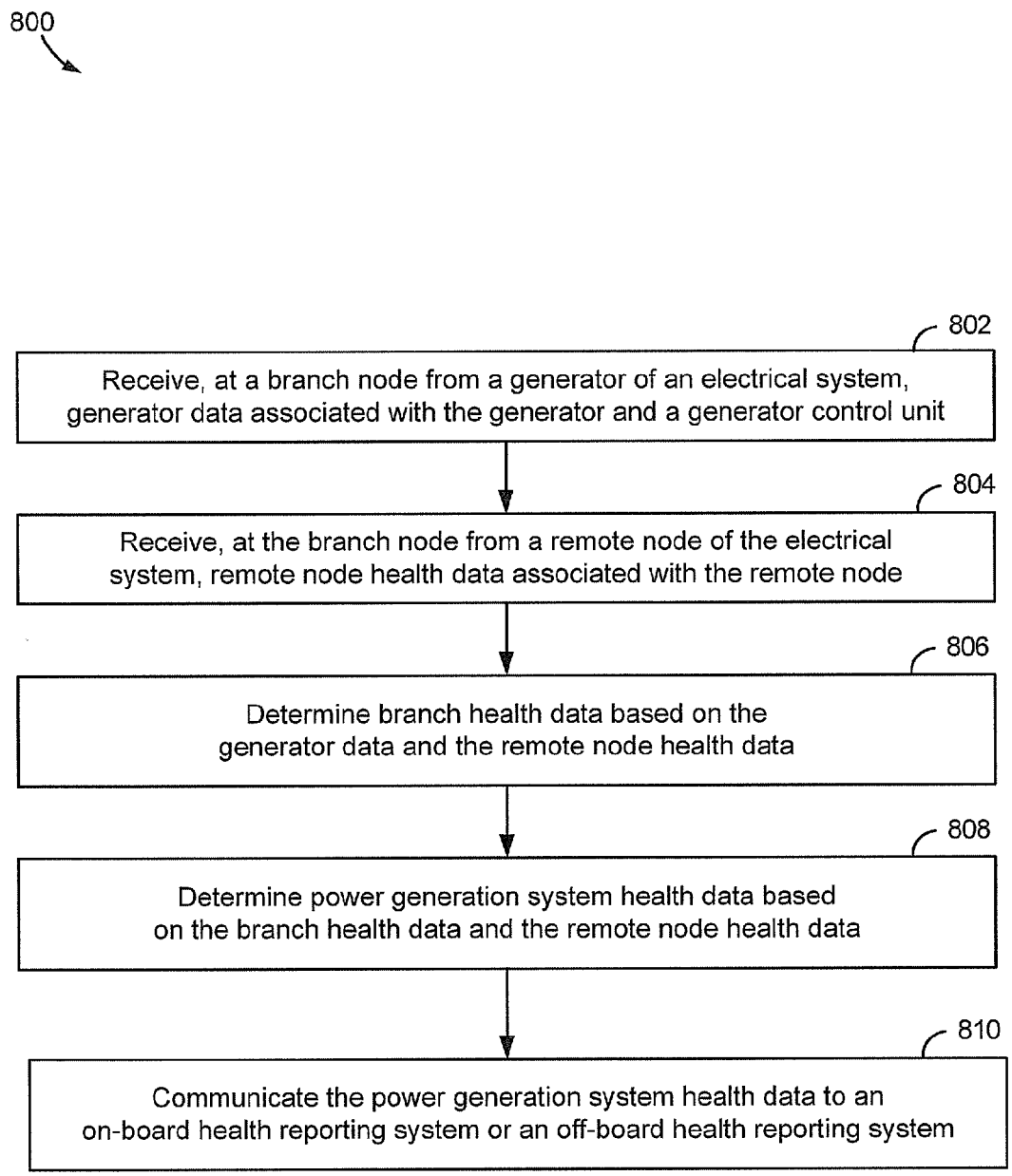
FIG. 8 is a flow chart illustrating a particular embodiment of a method of operating a distributed electrical power health system.

FIG. 8 is a flow chart illustrating a particular embodiment of a method 800 of operating a distributed electrical power health system. The distributed electrical power health system may include, be included within, or correspond to the system 100 of FIG. 1, the system 500 of FIG. 5, or the system 700 of FIG. 7. The method 800 may be performed by a branch node or another device associated with a branch level (e.g., the branch level 750 of FIG. 7) or associated with a system level (e.g., the system level 740 of FIG. 7).

In the method 800, generator data associated with a generator and a generator control unit is received at a branch node from the generator of an electrical system, at 802. For example, the generator may correspond to the generator 120 of FIG. 1 or the generators 520A-B of FIG. 5.

Remote node health data associated with a remote node may be received at the branch node from the remote node of the electrical system, at 804. For example, the remote node may include the remote nodes 140A-D of FIG. 1, the contactors 540A-K, the load controllers 542A-C, the loads 544A-C, or the cross tie contactor 546 of FIG. 5.

Branch health data may be determined based on the generator data and the remote node health data, at 806. The branch health data may be determined by the branch node. For example, the branch node may include the branch node 130 of FIG. 1 or the generator control units 530A-B of FIG. 5. The branch health data may include time-stamped sensor data, diagnostic information, prognostic information, or a combination thereof.

Power generation system health data may be determined based on the branch health data and the remote node health data, at 808. The power generation system health data may be determined by the branch node. The power generation system health data may include time-stamped sensor data, diagnostic information, prognostic information, or a combination thereof.

The power generation system health data may be communicated to an on-board health reporting system or an off-board health reporting system, at 810. For example, the on-board health reporting system may include the vehicle system 110 of FIG. 1, the vehicle system 512. The off-board health reporting system may include the off-board vehicle system 514 of FIG. 5.

The method 800 of FIG. 8 may be initiated or controlled by a field-programmable gate array (FPGA) device, an application-specific integrated circuit (ASIC), a processing unit, such as a central processing unit (CPU), a digital signal processor (DSP), a controller, another hardware device, a firmware device, or any combination thereof. As an example, the method 800 of FIG. 8 can be initiated or controlled by one or more processors, such as the processor 316 of FIG. 3, the processor 416 of FIG. 4, the processor 616 of FIG. 6, or the processor 920 of FIG. 9.

Figure 9:
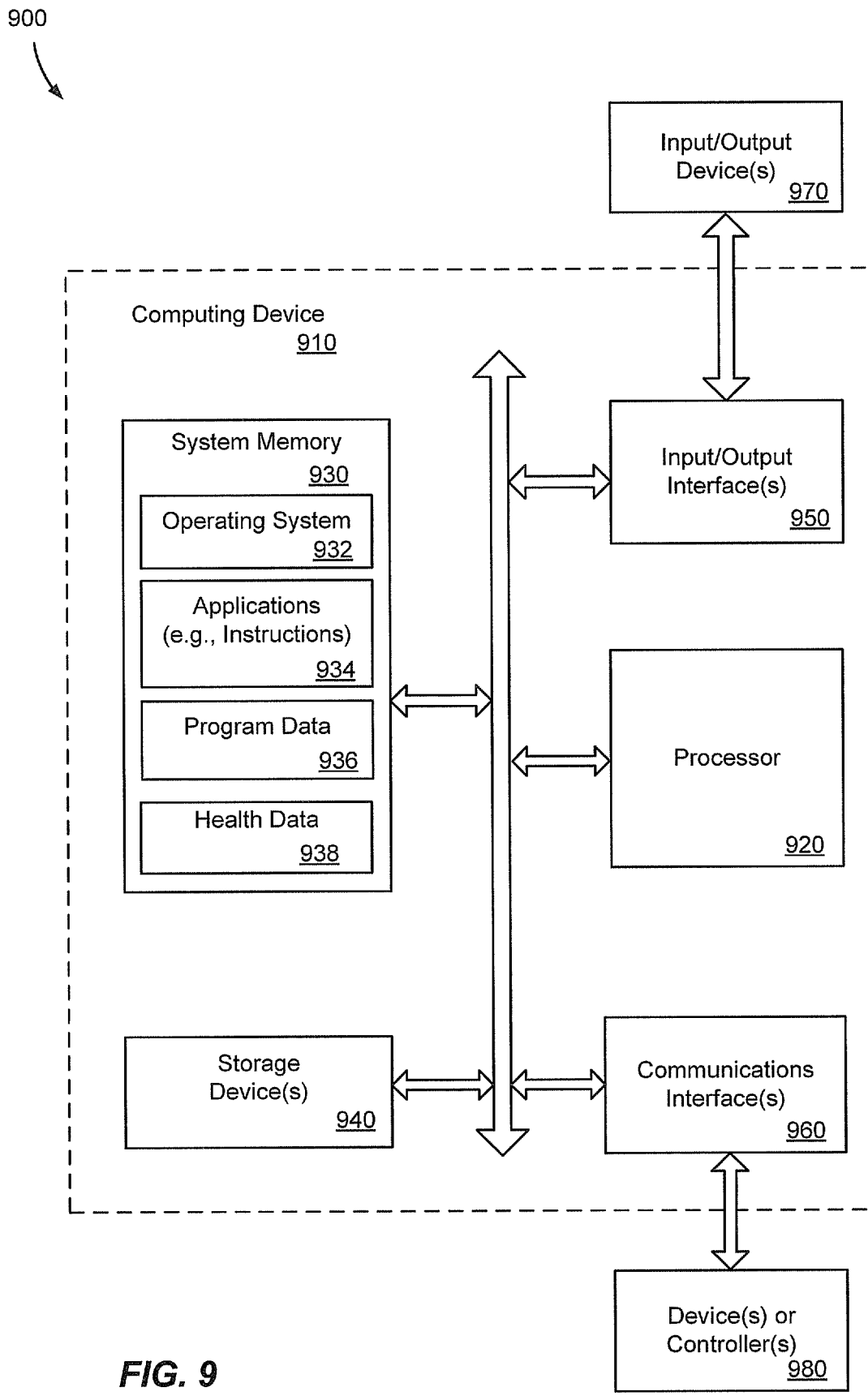
FIG. 9 is a block diagram illustrating a particular embodiment of a computing system, such as a node of a distributed electrical power health system.

FIG. 9 is a block diagram of a computing environment 900 including a computing device 910 operable to support vehicle electrical power system health management. For example, the computing device 910, or portions thereof, may be included within or correspond to the branch node 130, one or more of the remote nodes 140A-D, or the vehicle system 110 of FIG. 1; one or more of the generator control units 530A-B, one or more of the contactors 540A-E, one or more of the load controllers 542A-B, the cross tie contactor 546, the vehicle interface unit 510, the vehicle system 512, or the off-board vehicle system 514 of FIG. 5; a device of the node level 760, a device of the branch level 750, a device of the system level 740, or a device of the off-board health reporting system level 730 of FIG. 7.

The computing device 910 may include at least one processor 920. Within the computing device 910, the at least one processor 920 may communicate with a system memory 930, one or more storage devices 940, one or more input/output interfaces 950, one or more communications interfaces 960, or a combination thereof.

The system memory 930 may include volatile memory devices (e.g., random access memory (RAM) devices), nonvolatile memory devices (e.g., read-only memory (ROM) devices, programmable read-only memory, and flash memory), or both. The system memory 930 may include an operating system 932, which may include a basic input/output system for booting the computing device 910 as well as a full operating system to enable the computing device 910 to interact with users, other programs, and other devices. The system memory 930 may also include one or more applications (e.g., instructions) 934, program data 936, and health data 938. The program data 936 may include data used by the applications 934 to perform respective functions of the applications 934. The applications 934 may include instructions executable by the at least one processor 920 to determine status data, health data, diagnostic information, prognostic information, other information relate to a vehicle health management system, or a combination thereof. The health data 938 may include data that is analyzed or processed by the applications 934 to determine the status data, the health data, the diagnostic information, the prognostic information, the other information relate to a vehicle health management system, or the combination thereof. For example, the health data 938 may include time-stamped performance parameters and/or environmental measures, node usage data, local faults, branch usage and timed performance data, branch faults, system faults, system usage and timed performance data, maintenance data or other data described with reference to FIGS. 1-7.

The one or more storage devices 940 may include nonvolatile storage devices, such as magnetic disks, optical disks, or flash memory devices. The storage devices 940 may include both removable and non-removable memory devices. In a particular embodiment, the storage devices 940 may be configured to store the operating system 932, the applications 934, the program data 936, the health data 938, or a combination thereof. The system memory 930, the storage devices 940, or both, may include tangible, non-transitory computer-readable media or storage devices.

In a particular embodiment, the at least one processor 920 is configured to execute computer executable instructions, such as the applications 934, stored at a non-transitory computer-readable medium, such as the system memory 930. The instructions may be executable to cause the at least one processor 920 to receive, from a generator of an electrical system of a vehicle, generator data associated with the generator. The computer executable instructions may further be executable to cause the at least one processor 920 to receive, from a remote node of the electrical system, remote node health data associated with the remote node. The computer executable instructions may further be executable to cause the at least one processor 920 to communicate electrical system health data to a health management system of the vehicle. The electrical system health data is based on the generator data and the remote node health data.

The one or more input/output interfaces 950 may enable the computing device 910 to communicate with one or more input/output devices 970 to facilitate user interaction. For example, the one or more input/output interfaces 950 may be adapted to receive input from a user, to receive input from another computing device, or a combination thereof. The input/output interfaces 950 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 970 may include user interface devices and displays, including some combination of buttons, keyboards, pointing devices, displays, speakers, microphones, touch screens, and other devices.

The one or more communications interfaces 960 may enable the computing device 910 to communicate with one or more other computing devices or controllers 980. The one or more communications interfaces 960 may include wired Ethernet interfaces, IEEE 802 wireless interfaces, Bluetooth communication interfaces, electrical (or power line) interfaces, optical or radio frequency interfaces, or other wired or wireless interfaces. The other computer devices or controllers 980 may include host computers, servers, workstations, portable computers, telephones, tablet computers, or any other communication device or component. For example, the other computer devices or controllers 980 may include one or more remote nodes, one or more branch nodes, one or more vehicle systems (e.g., an on-board vehicle health management system), one or more off-board vehicle systems (e.g., an off-board vehicle health management system), or other devices described with reference to FIGS. 1-7.

Figure 10:
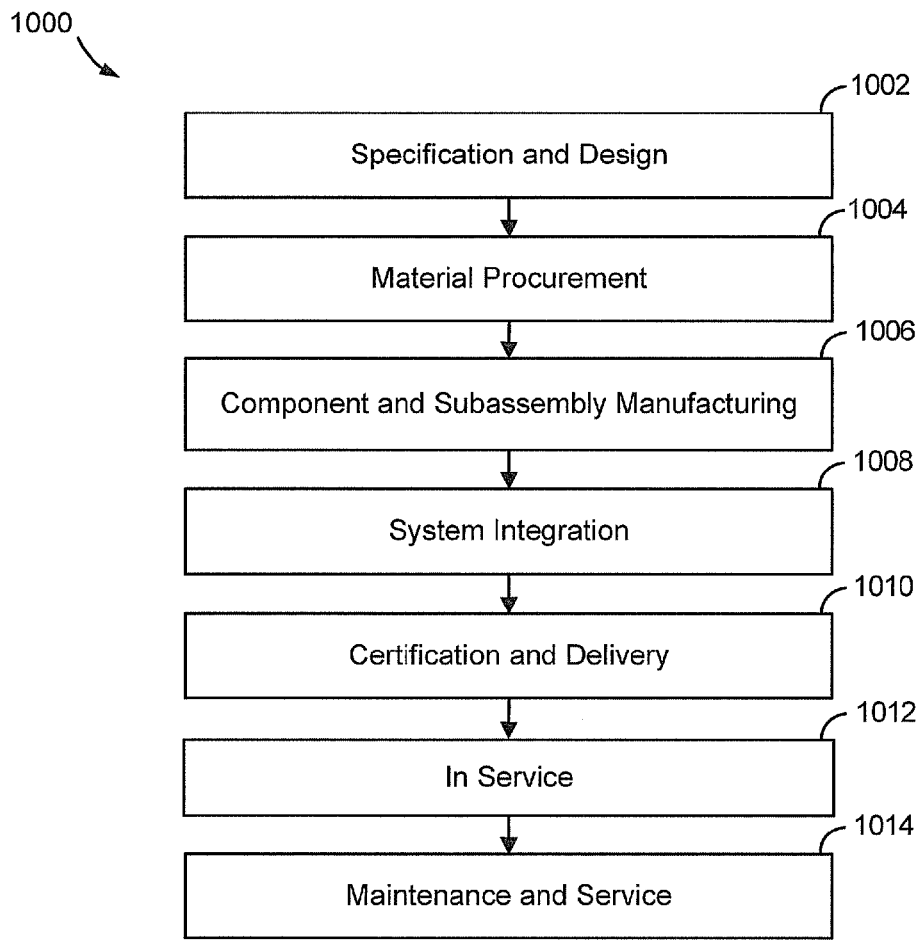
FIG. 10 is a flow diagram of a vehicle production and service methodology.
Figure 11:
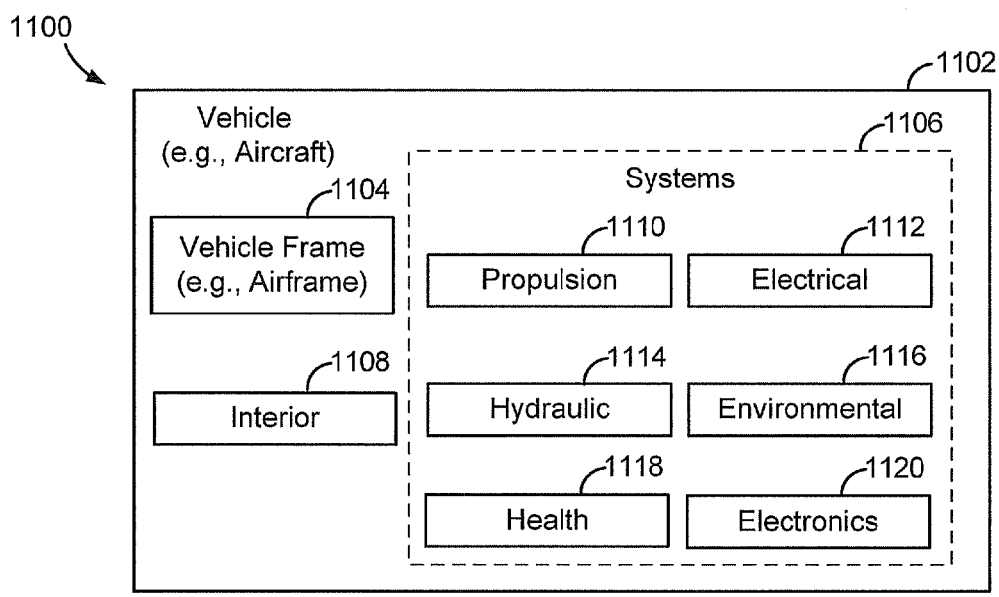
FIG. 11 is a block diagram of a vehicle including a health system.

Referring to FIGS. 10 and 11, examples of the disclosure are described in the context of a vehicle manufacturing and service method 1000 as illustrated by the flow chart of FIG. 10 and a vehicle system 1100 as illustrated by the block diagram of FIG. 11. A vehicle produced by the vehicle manufacturing and service method 1000 of FIG. 10 and a vehicle 1102 of FIG. 11 may include an aircraft, a watercraft, a land craft, a spacecraft, or combinations thereof.

Referring to FIG. 10, during pre-production, the method 1000 may include specification and design 1002 of the vehicle 1102 and material procurement 1004. For example, an electrical power system (e.g., an electrical system 1112 of FIG. 11) and corresponding health monitoring systems (e.g., an health system 1118 of FIG. 11) may be designed and specified.

During production, component and subassembly manufacturing 1006 and system integration 1008 of the vehicle 1102 takes place. For example, the electrical power system and health monitoring systems may be produced as subassemblies and integrated within the vehicle 1102. Thereafter, the vehicle 1102 may go through certification and delivery 1010 in order to be placed in service 1012. While in service by a customer, the vehicle 1102 may be scheduled for routine maintenance and service 1014 (which may also include modification, reconfiguration, refurbishment, and so on). For example, when the electrical power system or the health monitoring systems were not originally installed on the vehicle 1102, the vehicle 1102 may be reconfigured, during maintenance and service 1014, to include the electrical power system and health monitoring systems. Additionally, the health monitoring systems may be used, during maintenance and service 1014, to diagnosis problems with the electrical power system or to project problems with the electrical power system.

Each of the processes of the vehicle manufacturing and service method 1000 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be a transportation company (e.g., an airline), a leasing company, a military entity, a service organization, and so on.

As shown in FIG. 11, the vehicle system 1100 includes the vehicle 1102 produced by the vehicle manufacturing and service method 1000. The vehicle 1102 may include a vehicle frame 1104 (e.g., an airframe) with a plurality of systems 1106 and an interior 1108. Examples of high-level systems 1106 include one or more of a propulsion system 1110, the electrical system 1112, a hydraulic system 1114, an environmental system 1116, the vehicle health system 1118, and an electronics system 1120. Any number of other systems may be included.

Apparatus and methods embodied herein may be employed during any one or more of the stages of the vehicle manufacturing and service method 1000. For example, components or subassemblies corresponding to a production process may be fabricated or manufactured in a manner similar to components or subassemblies produced while the vehicle 1102 is in service. Also, one or more apparatus embodiments, method embodiments, or a combination thereof may be utilized during the production stages (e.g., the component subassembly manufacturing stage 1006 and the system integration stage 1008), for example, by substantially expediting assembly of or reducing the cost of the vehicle 1102. Similarly, one or more of apparatus embodiments, method embodiments, or a combination thereof may be utilized while the vehicle 1102 is in service, for example and without limitation, to maintenance and service 1014.

In these illustrative examples, the health monitoring system 1118 may be implemented in the vehicle 1102 during system integration 1008 or maintenance and service 1014. The health monitoring system 1118, in accordance with one or more embodiments disclosed herein, may be used while in service 1012 and/or during maintenance and service 1014.

Examples described above illustrate but do not limit the disclosure. It should also be understood that numerous modifications and variations are possible in accordance with the principles of the present disclosure. Accordingly, the scope of the disclosure is defined only by the following claims and their equivalents.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

What is claimed is:

1. An electrical power generation and distribution health monitoring system comprising:
   a network of a plurality of nodes included in an electrical system of a vehicle, wherein each node of the plurality of nodes is synchronized with other nodes of the plurality of nodes, and wherein the plurality of nodes includes:
      a generator control unit configured to collect data from a generator via a connection, wherein the generator control unit is configured to communicate electrical system health data associated with the electrical system to a vehicle system via a vehicle bus, and wherein the vehicle system is a component of the vehicle; and a plurality of remote nodes comprising a contactor, a load controller, and a load, wherein each remote node of the plurality of remote nodes is configured to transmit, via a communication backbone, respective remote node health data indicating its respective health to the generator control unit, wherein the generator control unit generates the electrical system health data based on the respective remote node health data and the data from the generator, wherein the vehicle bus is distinct from the communication backbone, and wherein the connection is distinct from the communication backbone and is distinct from the vehicle bus.

2. The electrical power generation and distribution health monitoring system of claim 1, wherein the health monitoring system further comprises:

a second network of a second plurality of nodes included in the electrical system, wherein each node of the second plurality of nodes is synchronized with other nodes of the second plurality of nodes, and wherein the second plurality of nodes includes:

a second generator control unit configured to collect second data from a second generator via a second connection, wherein the second generator control unit is configured to communicate second electrical system health data associated with the electrical system to the vehicle system via the vehicle bus; and a second plurality of remote nodes comprising a second contactor, a second load controller, and a second load, wherein each remote node of the second plurality of remote nodes is configured to transmit, via the communication backbone, respective second remote node health data indicating its respective health to the second generator control unit, wherein the second generator control unit generates the second electrical system health data based on the respective second remote node health data and the second data from the second generator, wherein the second connection is distinct from the connection, wherein the second connection is distinct from the communication backbone, and wherein the second connection is distinct from the vehicle bus.

3. The electrical power generation and distribution health monitoring system of claim 2, wherein the generator is configured to provide power to the generator control unit and the contactor, wherein the contactor is configured to provide power to the load controller and the load, wherein the second generator is configured to provide power to the second generator control unit and the second contactor, wherein the second contactor is configured to provide power to the second load controller and the second load, wherein the generator and the contactor do not provide power to the second generator control unit, the second contactor, the second load controller, or the second load, and wherein the second generator and the second contactor do not provide power to the generator control unit, the contactor, the load controller, or the load.

4. The electrical power generation and distribution health monitoring system of claim 2, wherein the health monitoring system further comprises:

a third network of a third plurality of nodes included in the electrical system, wherein each node of the third plurality of nodes is synchronized with other nodes of the third plurality of nodes, and wherein the third plurality of nodes includes:

a third plurality of remote nodes comprising a cross tie contactor, a third load controller, and a third load, wherein each remote node of the third plurality of remote nodes is configured to transmit, via the communication backbone, respective third remote node health data indicating its respective health to the second generator control unit, wherein the second generator control unit generates the second electrical system health data based on the respective second remote node health data, wherein the contactor and the second contactor are configured to provide power to the cross tie contactor, and wherein the cross tie contactor is configured to provide power to the third load controller and the third load.

5. The electrical power generation and distribution health monitoring system of claim 1, wherein the generator control unit is configured to receive a clock signal via the vehicle bus from the vehicle system.

6. The electrical power generation and distribution health monitoring system of claim 5, wherein the generator control unit is configured to transmit the clock signal to the plurality of remote nodes via the communication backbone.

7. The electrical power generation and distribution health monitoring system of claim 1, wherein the vehicle system includes a mission system.

8. The electrical power generation and distribution health monitoring system of claim 1, wherein the connection includes a wire that directly connects the generator to the generator control unit, wherein the vehicle bus is a serial bus, and wherein the communication backbone is a multi-drop serial link.

9. The electrical power generation and distribution health monitoring system of claim 1, wherein the vehicle system includes a vehicle management system.

10. The electrical power generation and distribution health monitoring system of claim 1, wherein the vehicle system includes a vehicle health management system.

11. The electrical power generation and distribution health monitoring system of claim 1, wherein the vehicle system includes a maintenance computer.

12. The electrical power generation and distribution health monitoring system of claim 1, wherein the vehicle system includes a support equipment device.

13. The electrical power generation and distribution health monitoring system of claim 1, wherein the vehicle system comprises data download hardware.

14. A system comprising:

a generator control unit (GCU) coupled to a generator via a connection, wherein the GCU is configured to function as a branch node and is configured to determine power generation system health data based on contactor health data, load controller health data, and load health data, and wherein the GCU is configured to transmit the power generation system health data to a vehicle system via a vehicle bus, wherein the vehicle bus is distinct from the connection, and wherein the vehicle system is a component of the vehicle; and a plurality of remote nodes communicatively coupled to the GCU via a communication backbone that is distinct from the connection and is distinct from the vehicle bus, the plurality of remote nodes comprising:

a contactor configured to function as a first remote node and configured to communicate the contactor health data and a feeder identifier associated with the contactor to the GCU via the communication backbone, wherein the contactor health data indicates a health of the contactor;

a load controller configured to function as a second remote node and configured to communicate the load controller health data and a first bus identifier associated with the load controller to the GCU via the communication backbone, wherein the load controller health data indicates a health of the load controller; and a load configured to function as a third remote node and configured to communicate the load health data and a second bus identifier associated with the load controller to the GCU via the communication backbone, wherein the load health data indicates a health of the load.

15. The system of claim 14, wherein the GCU is configured to perform branch level diagnostics based on the contactor health data, the load controller health data, and the load health data to generate the power generation system health data, wherein the vehicle system is configured to generate system faults based on the power generation system health data, and wherein the vehicle system is configured to transmit the system faults to an off-board health reporting system.

16. The system of claim 14, wherein the generator is not communicatively coupled with the vehicle bus and is not communicatively coupled to the communication backbone.

17. The system of claim 14, wherein the power generation system health data is associated with a power generation system, the power generation system including the generator, the GCU, or a combination thereof.

18. The system of claim 14, wherein the contactor determines the contactor health data based on a temperature, a current, a voltage, or a combination thereof, of the contactor.

19. The system of claim 18, wherein the contactor determines the contactor health data and usage data periodically.

20. The system of claim 14, wherein the generator is communicatively coupled to the GCU only through the connection.

21. The system of claim 14, wherein the load controller is time synchronized with the GCU.

22. A method comprising:
receiving, at a generator control unit from a generator of an electrical system via a connection, generator data associated with the generator;
receiving, at the generator control unit from remote nodes of the electrical system via a communication backbone, respective remote node health data indicating a respective health associated with each of the remote nodes, wherein the communication backbone is distinct from the connection, and wherein remote nodes comprise at least a contactor, a load controller, a load, or a combination thereof;
determining, by the generator control unit based on the generator data and the respective remote node health data, power generation system health data associated with a power generation system; and
communicating the power generation system health data to a vehicle system from the generator control unit via a vehicle bus, wherein the vehicle bus is distinct from the communication backbone, wherein the connection is distinct from the vehicle bus, and wherein the vehicle system is a component of the vehicle.

23. The method of claim 22, wherein the power generation system health data is communicated via a controller area network bus.

24. The method of claim 22, wherein the power generation system health data is time-sequenced with other data at the vehicle system.

* * * * *